United States Patent
Pu et al.

(10) Patent No.: US 11,523,323 B2
(45) Date of Patent: Dec. 6, 2022

(54) UNMANNED AERIAL VEHICLE AND CONTROLLER ASSOCIATION

(71) Applicant: Apple Inc., Cupertino, CA (US)

(72) Inventors: Han Pu, Hong Kong (HK); Alosious Pradeep Prabhakar, Singapore (SG); Jordi Agud Ruiz, Meguro-ku (JP); Krisztian Kiss, Hayward, CA (US); Srinivasan Nimmala, San Jose, CA (US); Vijay Venkataraman, San Jose, CA (US); Yip Pong Herbert Wong, Hong Kong (HK)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/241,988

(22) Filed: Apr. 27, 2021

(65) Prior Publication Data

US 2021/0352558 A1    Nov. 11, 2021

(30) Foreign Application Priority Data

May 8, 2020   (SG) .......................... 10202004252X

(51) Int. Cl.
| | |
|---|---|
| *H04W 36/32* | (2009.01) |
| *H04W 76/30* | (2018.01) |
| *H04W 76/25* | (2018.01) |
| *H04W 48/04* | (2009.01) |
| *H04W 84/06* | (2009.01) |

(52) U.S. Cl.
CPC .......... *H04W 36/32* (2013.01); *H04W 48/04* (2013.01); *H04W 76/25* (2018.02); *H04W 76/30* (2018.02); *H04W 84/06* (2013.01)

(58) Field of Classification Search
CPC .. H04B 7/18541; H04B 17/382; H04W 40/36
See application file for complete search history.

(56) References Cited

U.S. PATENT DOCUMENTS

| | | | | |
|---|---|---|---|---|
| 2017/0242431 | A1* | 8/2017 | Dowlatkhah | G05D 1/0027 |
| 2017/0285633 | A1* | 10/2017 | Poornachandran | G05D 1/0022 |
| 2020/0137799 | A1* | 4/2020 | Chang | H04W 48/20 |
| 2021/0144607 | A1* | 5/2021 | Hong | H04W 76/15 |

* cited by examiner

*Primary Examiner* — Ashley Shivers
(74) *Attorney, Agent, or Firm* — Kowert, Hood, Munyon, Rankin & Goetzel, P.C.

(57) ABSTRACT

Apparatuses, systems, and methods for pairing/unpairing unmanned aerial vehicles (UAVs) to/from UAV controllers (UACs). A UAV and/or a UAC may initiate, based on a triggering condition, a paring/unpairing of the UAV to/from a host UAC and receive, from a network, a configuration update that may confirm the paring/unpairing of the UAV to/from the host UAC. The triggering condition may include at least one of the UAV moving from a location designated as controlled by the host UAC, the UAV moving into a location in which the host UAC is restricted from controlling the host UAV, and/or the host UAC losing signaling capabilities. The configuration update may include at least one of a cause code, an identifier associated with the UAV, an identifier associated with the host UAC, an identifier associated with an unmanned aerial system (UAS).

20 Claims, 24 Drawing Sheets

FIG. 13B

| UAV Controller (UAC) | Location |
|---|---|
| UAC 122a | Area 1310a |
| UAC 122b | Area 1310b |
| UAC 122c | Area 1310c |
| ... | ... |
| UAC 122n | Area 1310n |

UNMANNED AERIAL VEHICLE AND CONTROLLER ASSOCIATION

PRIORITY INFORMATION

This application claims benefit of priority to Singapore Patent Application Serial No. 10202004252X, titled "Unmanned Aerial Vehicle and Controller Association", filed May 8, 2020, which is hereby incorporated by reference in its entirety as though fully and completely set forth herein.

FIELD

The invention relates to unmanned aerial vehicles (UAVs), and more particularly to a system and method for pairing/unpairing UAVs to/from UAV controllers.

DESCRIPTION OF THE RELATED ART

Unmanned aerial vehicles, also referred to as drones, may be characterized as mobile devices or systems that are used for various applications, such as acquiring or sensing information (e.g., video acquisition or surveillance), delivering goods, or other activities. The usage of UAVs has rapidly increased in recent years, in part due to the many applications in which they can be used. For example, UAVs may be utilized to travel to remote, inaccessible, and/or inconvenient locations to perform various actions. In some applications, a UAV is controlled by a human user (e.g., a user on the ground), where the user uses a UAV controller (UAC) to remotely control the operation of the UAV. In some implementations, the UAC may communicate with the UAV over an existing cellular network. One issue that may arise is what information may be required for the existing cellular network to track and/or control the UAV and/or how to track the UAC. Therefore, improvements in the field are desired.

SUMMARY

Embodiments relate to apparatuses, systems, and methods for pairing/unpairing UAVs to/from UAV controllers. Embodiments may include various methods for pairing/unpairing UAVs to/from UAV controllers (UACs).

For example, in some embodiments, a wireless device, e.g., a UE such as a UAV and/or a UAC, may initiate, based on a triggering condition, an unpairing of the UAV from a host UAC, e.g., a UAC that is currently paired to the UAV. Additionally, the wireless device may receive, from a network (e.g., from a network entity, such as an AMF), a configuration update that may confirm the unpairing of the UAV from the host UAC. In some embodiments, the triggering condition may include any, any combination of, and/or all of (e.g., at least one of) the UAV moving from a location designated as controlled by the host UAC, the UAV moving into a location in which the host UAC is restricted from controlling the host UAV, and/or the host UAC losing signaling capabilities. In some embodiments, the configuration update may include any, any combination of, and/or all of (e.g., at least one of) a cause code, an identifier associated with the UAV, an identifier associated with the host UAC, an identifier associated with an unmanned aerial system (UAS) (e.g., where the UAS includes the UAV and the host UAC), and/or an identifier associated with a target UAC.

As another example, in some embodiments, a computer system, such as an unmanned aerial system (UAS) tracking management (UTM) system, may track a location of a UAV that is paired to a host UAC e.g., a UAC that is currently paired to the UAV. Additionally, the computer system may send, based on a triggering condition, an unpairing request to a network node. The unpairing request may initiate an unpairing of the UAV from the host UAC. Further, the computer system may receive, from the network node, an unpairing response that may confirm the unpairing of the UAV from the host UAC. In some embodiments, the triggering condition may include any, any combination of, and/or all of (e.g., at least one of) the UAV moving from a location designated as controlled by the host UAC, the UAV moving into a location in which the host UAC is restricted from controlling the host UAV, and/or the host UAC losing signaling capabilities. In some embodiments, the unpairing request may include any, any combination of, and/or all of (e.g., at least one of) a cause code, an identifier associated with the UAV, an identifier associated with the host UAC, an identifier associated with an unmanned aerial system (UAS) (e.g., where the UAS includes the UAV and the host UAC), and/or an identifier associated with a target UAC.

As a further example, in some embodiments, a network node, such as a core access and mobility management function (AMF) of a network hosting a UAV, may receive, based on a triggering condition, an unpairing request from UTM system. The unpairing request may initiate an unpairing of the UAV from a host UAC, e.g., a UAC that is currently paired to the UAV. Additionally, the network node may send to the UAV and/or host UAC, a configuration update command that may indicate the unpairing of the UAV from the host UAC and receive, from the UAV and/or host UAC, a configuration update response that may confirm the unpairing of the UAV from the host UAC. Further, the network node may send, to the UTM system, an unpairing response that may confirm the unpairing of the UAV from the host UAC. In some embodiments, the triggering condition may include any, any combination of, and/or all of (e.g., at least one of) the UAV moving from a location designated as controlled by the host UAC, the UAV moving into a location in which the host UAC is restricted from controlling the host UAV, and/or the host UAC losing signaling capabilities. In some embodiments, any, any combination of, and/or all of (e.g., at least one of) the unpairing request, the configuration update command, the configuration update response, and/or the unpairing response may include any, any combination of, and/or all of (e.g., at least one of) a cause code, an identifier associated with the UAV, an identifier associated with the host UAC, an identifier associated with an unmanned aerial system (UAS) (e.g., where the UAS includes the UAV and the host UAC), and/or an identifier associated with a target UAC.

The techniques described herein may be implemented in and/or used with a number of different types of devices, including but not limited to unmanned aerial vehicles (UAVs), unmanned aerial controllers (UACs), a UTM server, base stations, access points, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 13B illustrates an example of a mapping table of UAV controllers to control areas, according to some embodiments.

Figure 1A:
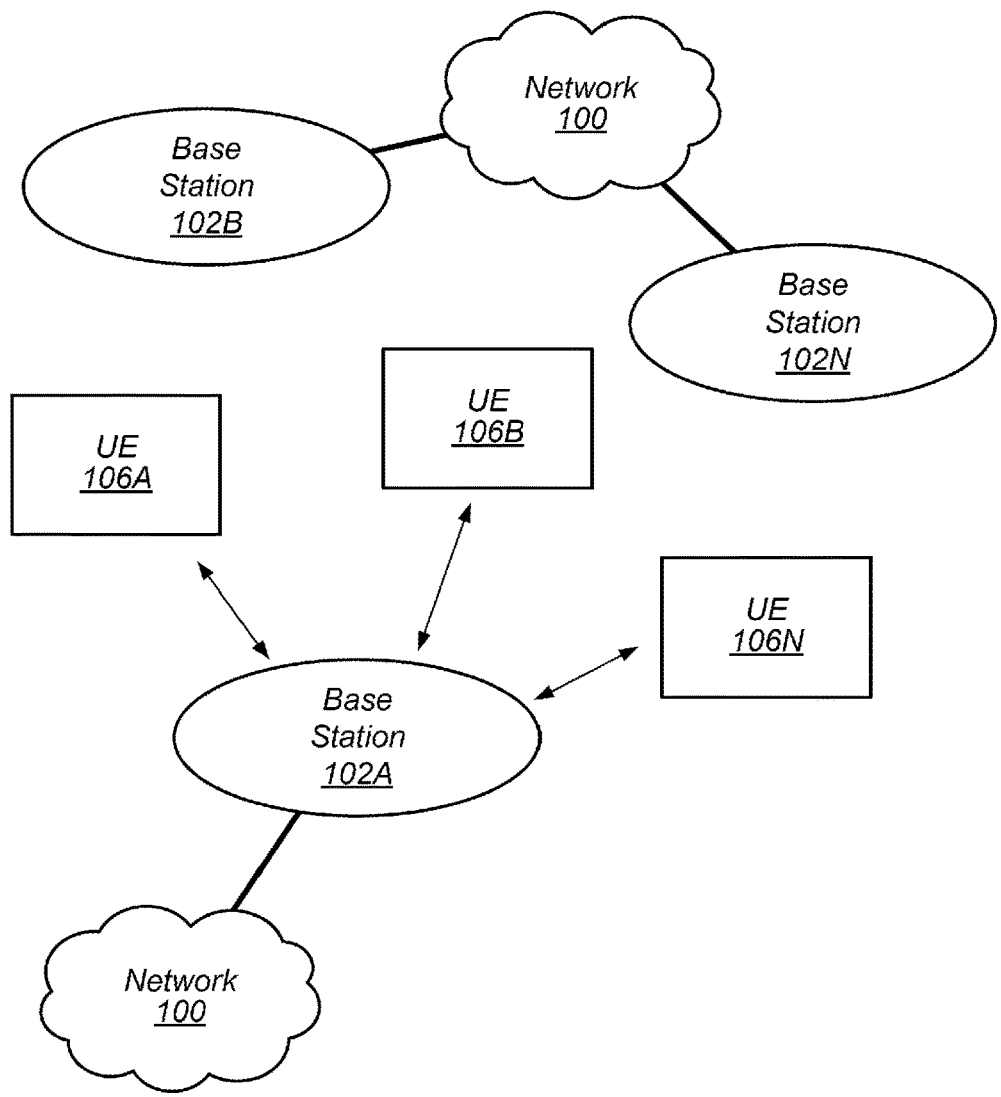
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UAV: Unmanned Aerial Vehicle
UAC: Unmanned Aerial Controller
UAS: Unmanned Aerial System
UTM: UAS Traffic Management
C2: Command and Control
BLOS: Beyond Line of Sight
3GPP: Third Generation Partnership Project
TPAE: Third Party Authorized Entity
UE: User Equipment
RF: Radio Frequency
BS: Base Station
DL: Downlink
UL: Uplink
LTE: Long Term Evolution
NR: New Radio
5GS: 5G System
5GMM: 5GS Mobility Management
5GCN: 5G Core Network
IE: Information Element

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, other handheld devices, unmanned aerial vehicles (UAVs) (e.g., drones), UAV controllers (UACs), and so forth. In general, the term "UE" or "UE device" can be broadly defined to encompass any electronic, computing, and/or telecommunications device (or combination of devices) which is easily transported by a user and capable of wireless communication.

Unmanned Aerial Vehicle (UAV)—any of various types of unmanned devices or systems capable of aerial operation (flight). UAVs are also commonly referred to as "drones". The term "UAV" has the full extent of its ordinary meaning.

Base Station—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
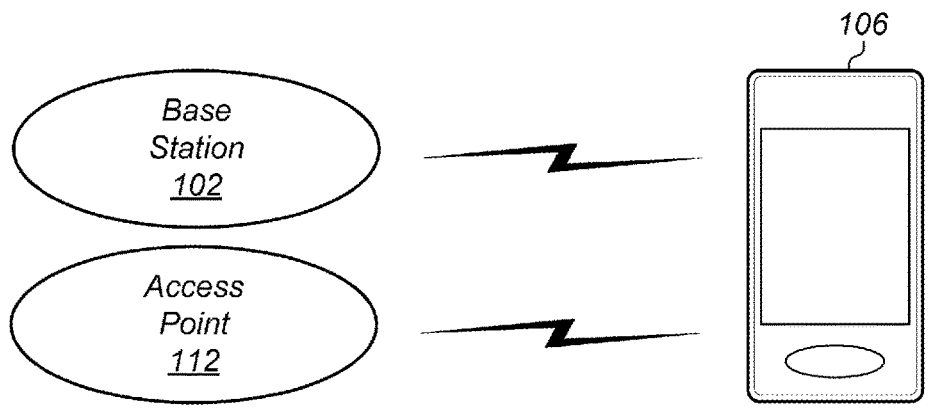
FIG. 1B illustrates an example of a base station (BS) and an access point in communication with a user equipment (UE) device according to some embodiments.

FIGS. 1A and 1B: Communication Systems

FIG. 1A illustrates a simplified example wireless communication system, according to some embodiments. It is noted that the system of FIG. 1A is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1xRTT/1xEV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1xRTT or LTE or GSM), and separate radios for communicating using each of Wi-Fi and Bluetooth. Other configurations are also possible.

Figure 2:
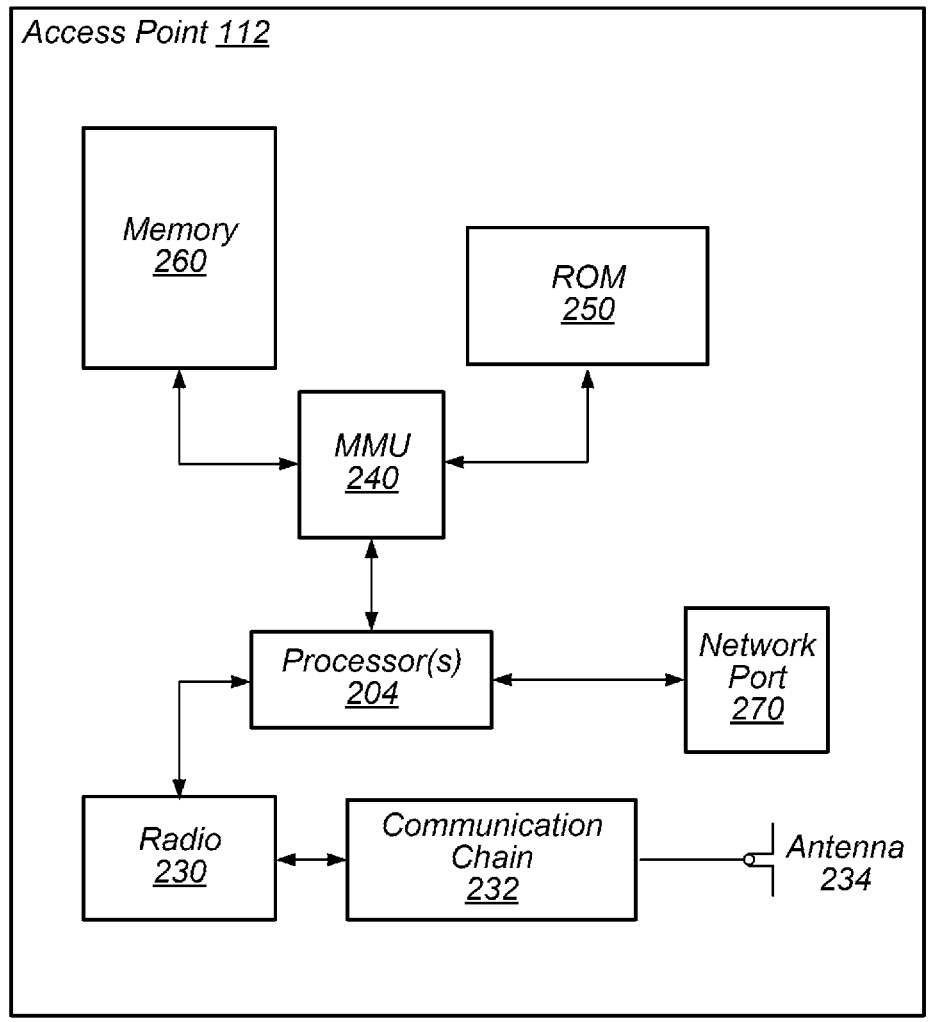
FIG. 2 illustrates an example simplified block diagram of a WLAN Access Point (AP), according to some embodiments.

FIG. 2: Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for pairing/unpairing UAVs to/from UAV controllers as further described herein.

Figure 3:
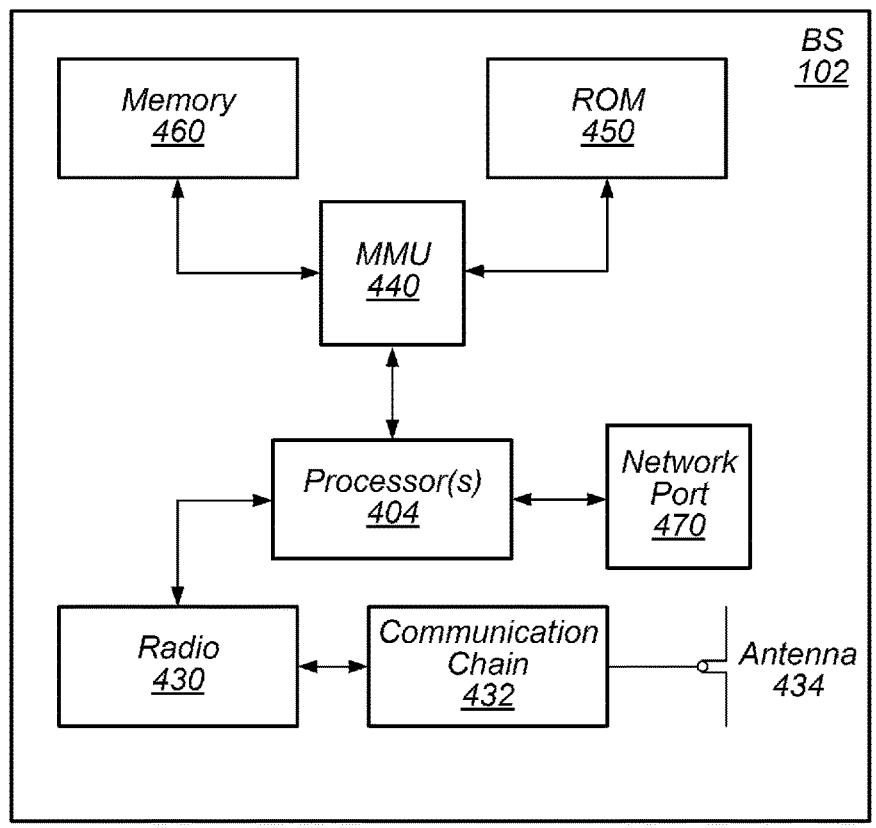
FIG. 3 illustrates an example block diagram of a BS according to some embodiments.

FIG. 3: Block Diagram of a Base Station

FIG. 3 illustrates an example block diagram of a base station 102, according to some embodiments. It is noted that the base station of FIG. 3 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 4:
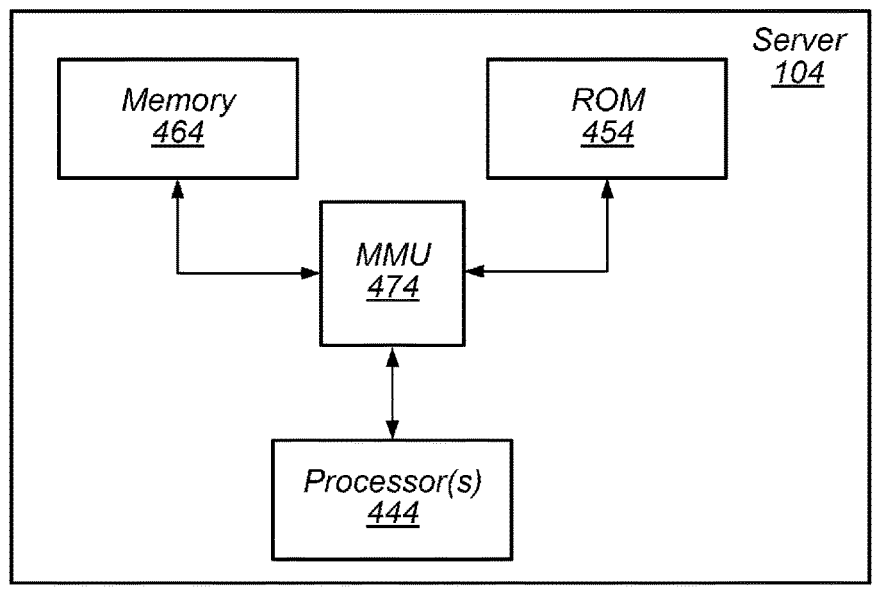
FIG. 4 illustrates an example block diagram of a server according to some embodiments.

FIG. 4: Block Diagram of a Server

FIG. 4 illustrates an example block diagram of a server 104, according to some embodiments. It is noted that the base station of FIG. 4 is merely one example of a possible server. As shown, the server 104 may include processor(s) 444 which may execute program instructions for the server 104. The processor(s) 444 may also be coupled to memory management unit (MMU) 474, which may be configured to receive addresses from the processor(s) 444 and translate those addresses to locations in memory (e.g., memory 464 and read only memory (ROM) 454) or to other circuits or devices.

The server 104 may be configured to provide a plurality of devices, such as base station 102, UE devices 106, and/or UTM 108, access to network functions, e.g., as further described herein.

In some embodiments, the server 104 may be part of a radio access network, such as a 5G New Radio (5G NR) radio access network. In some embodiments, the server 104 may be connected to a legacy evolved packet core (EPC) network and/or to a NR core (NRC) network.

As described further subsequently herein, the server 104 may include hardware and software components for implementing or supporting implementation of features described herein. The processor 444 of the server 104 may be configured to implement or support implementation of part or all of the methods described herein, e.g., by executing program instructions stored on a memory medium (e.g., a non-transitory computer-readable memory medium). Alternatively, the processor 444 may be configured as a programmable hardware element, such as an FPGA (Field Programmable Gate Array), or as an ASIC (Application Specific Integrated Circuit), or a combination thereof. Alternatively (or in addition) the processor 444 of the server 104, in conjunction with one or more of the other components 454, 464, and/or 474 may be configured to implement or support implementation of part or all of the features described herein.

In addition, as described herein, processor(s) 444 may be comprised of one or more processing elements. In other words, one or more processing elements may be included in processor(s) 444. Thus, processor(s) 444 may include one or more integrated circuits (ICs) that are configured to perform the functions of processor(s) 444. In addition, each integrated circuit may include circuitry (e.g., first circuitry, second circuitry, etc.) configured to perform the functions of processor(s) 444.

Figure 5A:
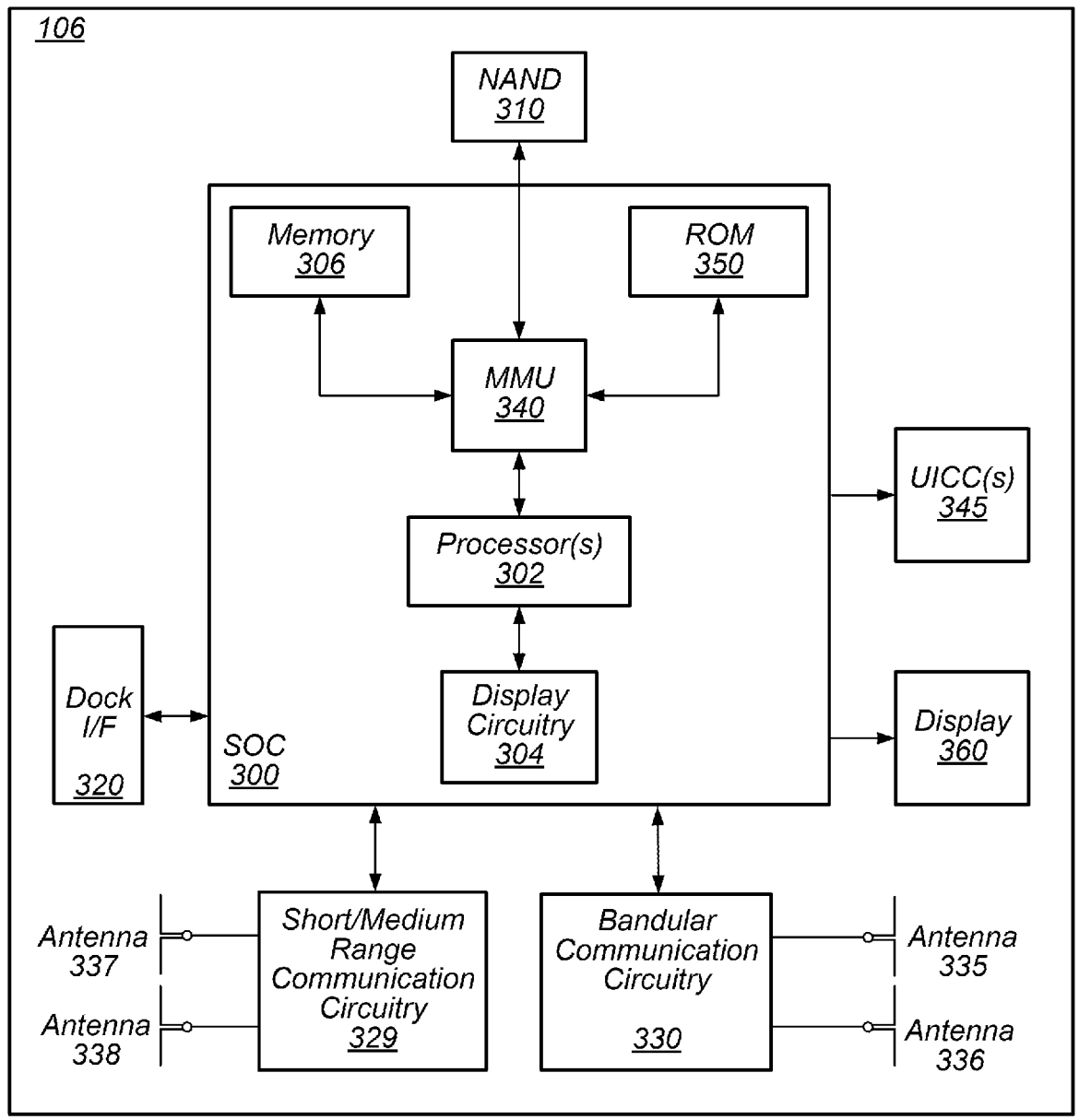
FIG. 5A illustrates an example block diagram of a UE according to some embodiments.

FIG. 5A: Block Diagram of a UE

FIG. 5A illustrates an example simplified block diagram of a communication device 106, according to some embodiments. It is noted that the block diagram of the communication device of FIG. 5A is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, an unmanned aerial vehicle (UAV), a UAV controller (UAC) and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345. Note that the term "SIM" or "SIM entity" is intended to include any of various types of SIM implementations or SIM functionality, such as the one or more UICC(s) cards 345, one or more eUICCs, one or more eSIMs, either removable or embedded, etc. In some embodiments, the UE 106 may include at least two SIMs. Each SIM may execute one or more SIM applications and/or otherwise implement SIM functionality. Thus, each SIM may be a single smart card that may be embedded, e.g., may be soldered onto a circuit board in the UE 106, or each SIM 310 may be implemented as a removable smart card. Thus the SIM(s) may be one or more removable smart cards (such as UICC cards, which are sometimes referred to as "SIM cards"), and/or the SIMS 310 may be one or more embedded cards (such as embedded UICCs (eUICCs), which are sometimes referred to as "eSIMs" or "eSIM cards"). In some embodiments (such as when the SIM(s) include an eUICC), one or more of the SIM(s) may implement embedded SIM (eSIM) functionality; in such an embodiment, a single one of the SIM(s) may execute multiple SIM applications. Each of the SIMs may include components such as a processor and/or a memory; instructions for performing SIM/eSIM functionality may be stored in the memory and executed by the processor. In some embodiments, the UE 106 may include a combination of removable smart cards and fixed/non-removable smart cards (such as one or more eUICC cards that implement eSIM functionality), as desired. For example, the UE 106 may comprise two embedded SIMs, two removable SIMs, or a combination of one embedded SIMs and one removable SIMS. Various other SIM configurations are also contemplated.

As noted above, in some embodiments, the UE 106 may include two or more SIMs. The inclusion of two or more SIMs in the UE 106 may allow the UE 106 to support two different telephone numbers and may allow the UE 106 to communicate on corresponding two or more respective networks. For example, a first SIM may support a first RAT such as LTE, and a second SIM 310 support a second RAT such as 5G NR. Other implementations and RATs are of course possible. In some embodiments, when the UE 106 comprises two SIMs, the UE 106 may support Dual SIM Dual Active (DSDA) functionality. The DSDA functionality may allow the UE 106 to be simultaneously connected to two networks (and use two different RATs) at the same time, or to simultaneously maintain two connections supported by two different SIMs using the same or different RATs on the same or different networks. The DSDA functionality may also allow the UE 106 to simultaneously receive voice calls or data traffic on either phone number. In certain embodiments the voice call may be a packet switched communication. In other words, the voice call may be received using voice over LTE (VoLTE) technology and/or voice over NR (VoNR) technology. In some embodiments, the UE 106 may support Dual SIM Dual Standby (DSDS) functionality. The DSDS functionality may allow either of the two SIMS in the UE 106 to be on standby waiting for a voice call and/or data connection. In DSDS, when a call/data is established on one SIM, the other SIM is no longer active. In some embodiments, DSDx functionality (either DSDA or DSDS functionality) may be implemented with a single SIM (e.g., a eUICC) that executes multiple SIM applications for different carriers and/or RATs.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for pairing/unpairing UAVs to/from UAV controllers as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 5B:
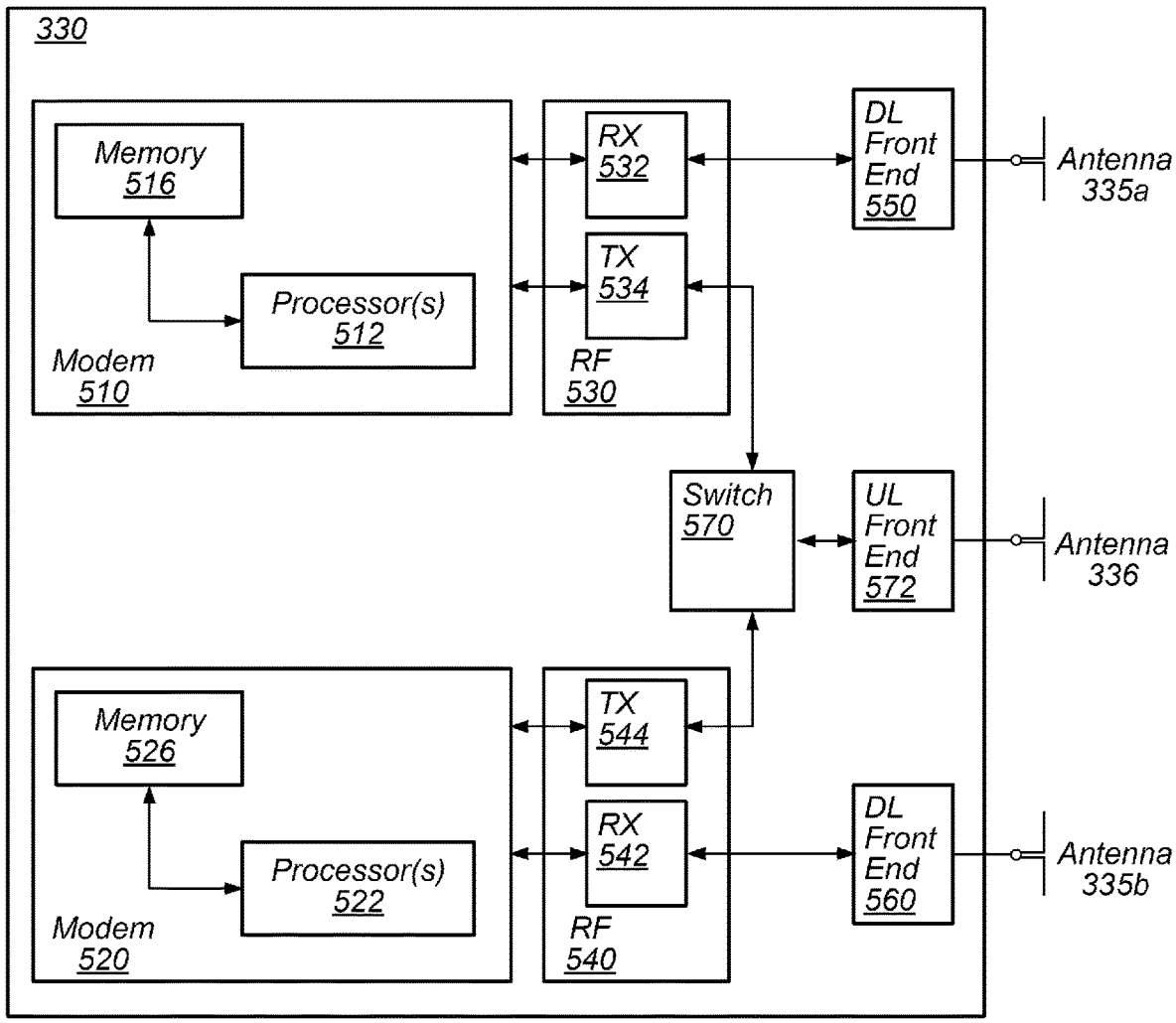
FIG. 5B illustrates an example block diagram of cellular communication circuitry, according to some embodiments.

FIG. 5B: Block Diagram of Cellular Communication Circuitry

FIG. 5B illustrates an example simplified block diagram of cellular communication circuitry, according to some embodiments. It is noted that the block diagram of the cellular communication circuitry of FIG. 5B is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods pairing/unpairing UAVs to/from UAV controllers as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
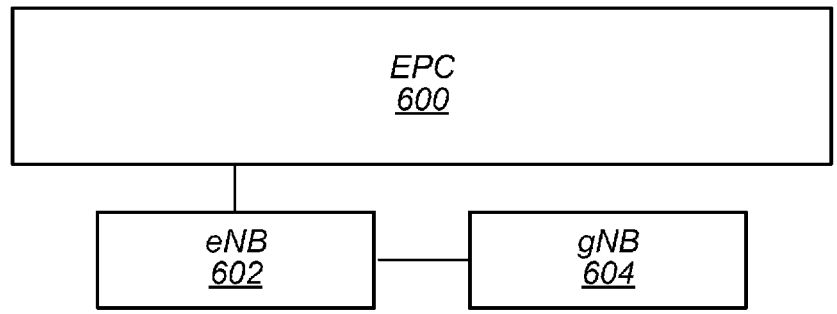
FIG. 6A illustrates an example of connections between an EPC network, an LTE base station (eNB), and a 5G NR base station (gNB).
Figure 6B:
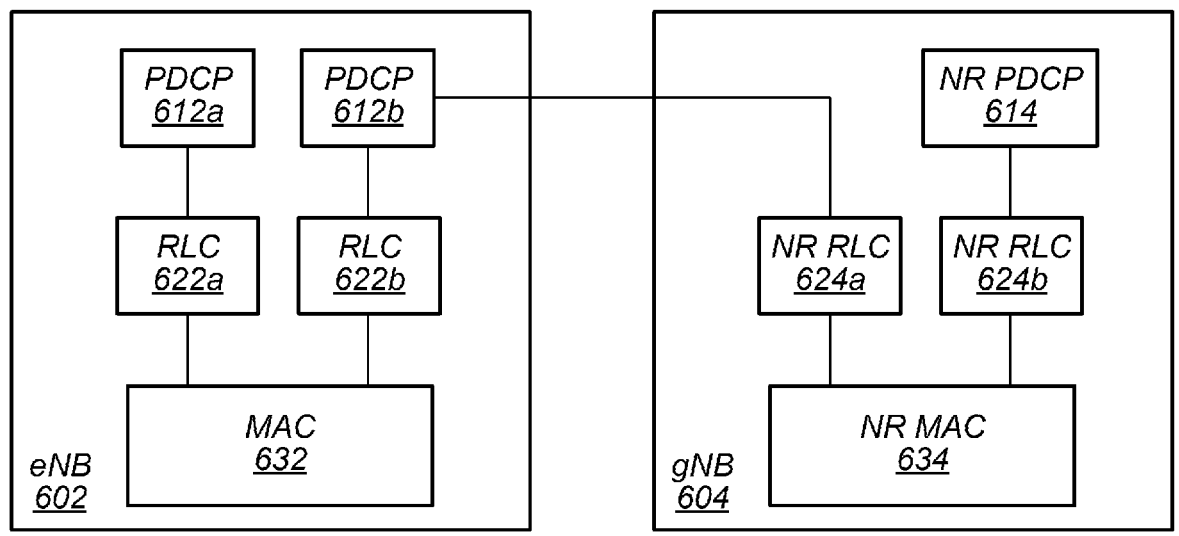
FIG. 6B illustrates an example of a protocol stack for an eNB and a gNB.

FIGS. 6A and 6B: 5G NR Architecture with LTE

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

Figure 7A:
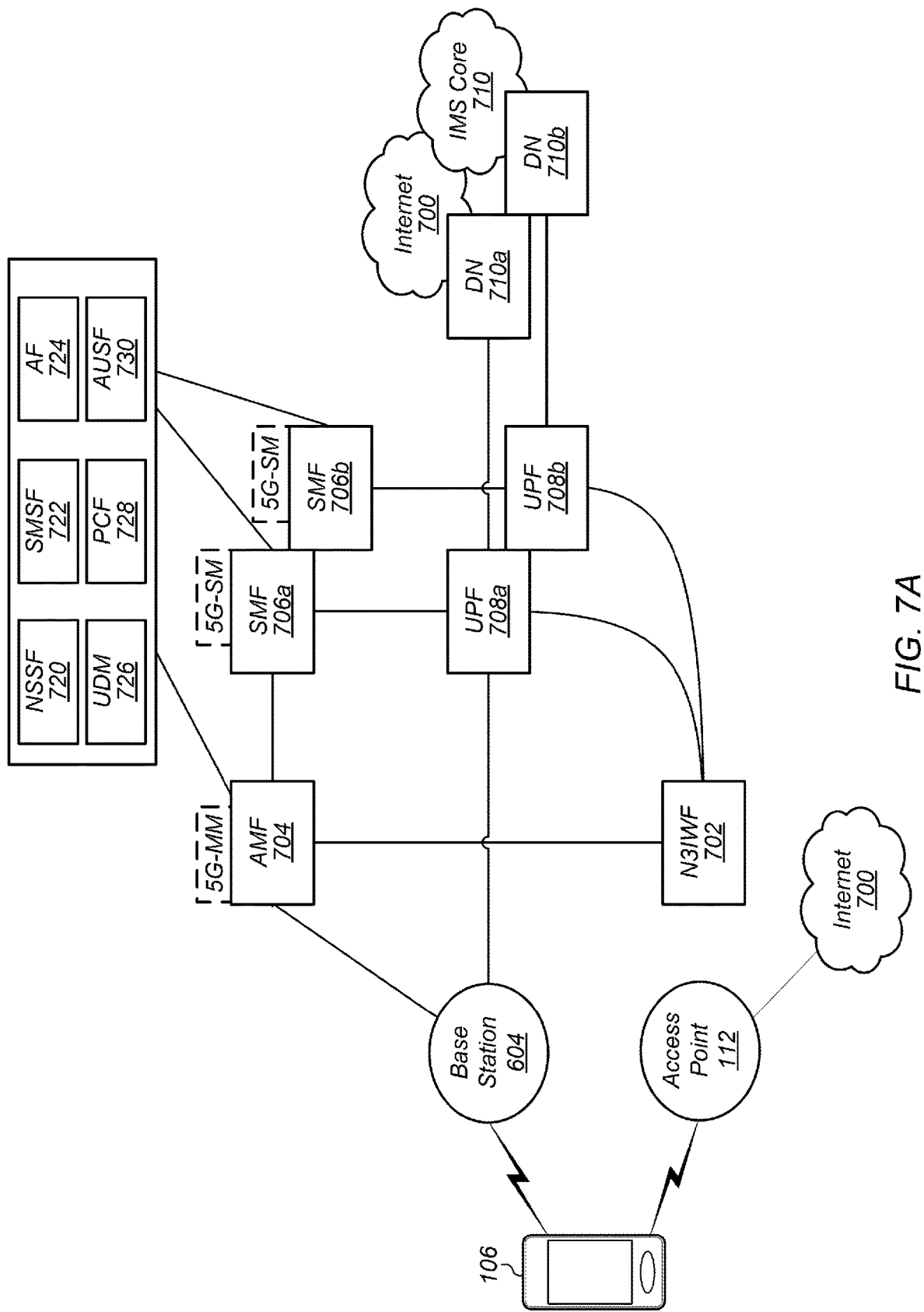
FIG. 7A illustrates an example of a 5G network architecture that incorporates both 3GPP (e.g., cellular) and non-3GPP (e.g., non-cellular) access to the 5G CN, according to some embodiments.
Figure 7B:
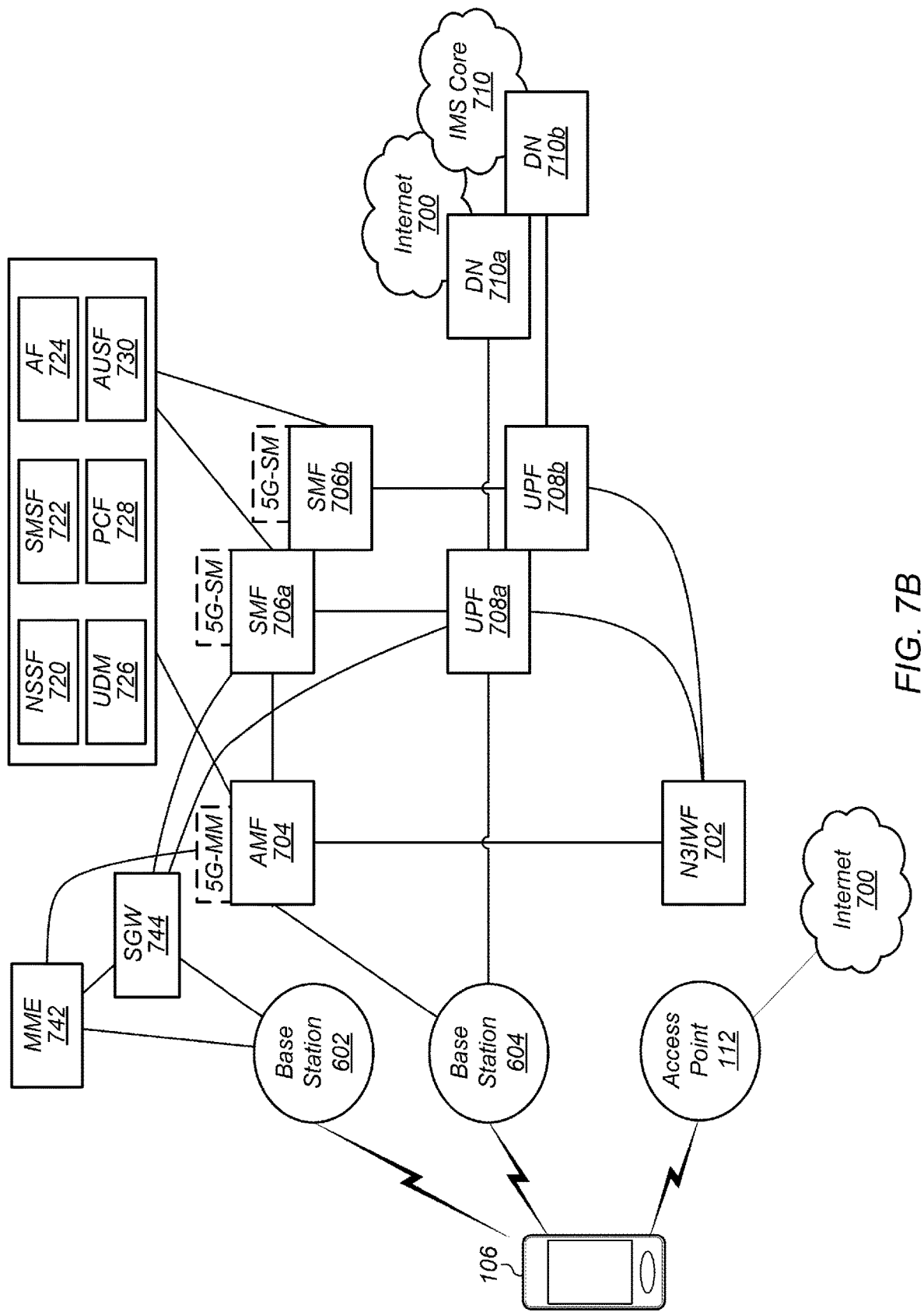
FIG. 7B illustrates an example of a 5G network architecture that incorporates both dual 3GPP (e.g., LTE and 5G NR) access and non-3GPP access to the 5G CN, according to some embodiments.
Figure 8:
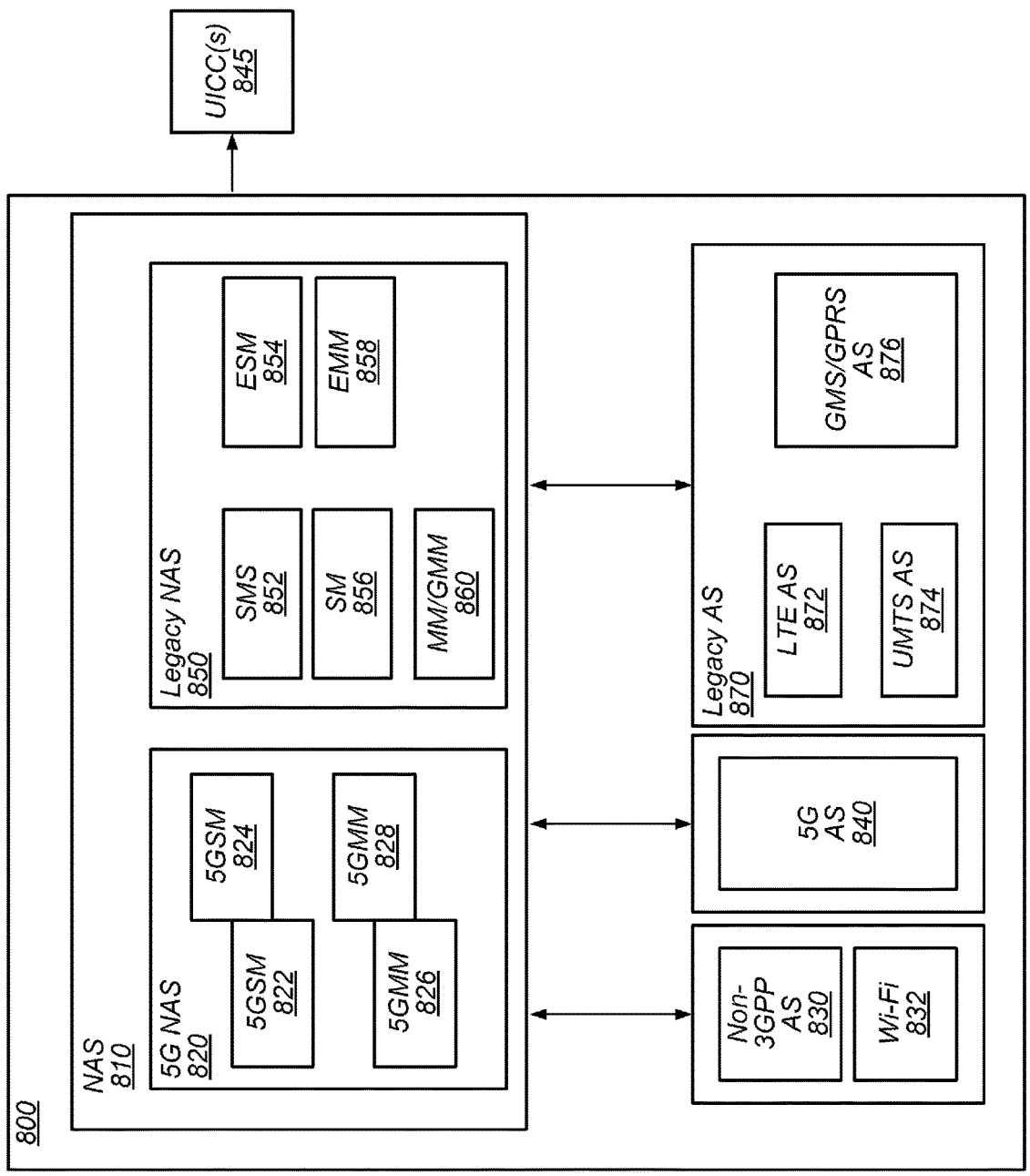
FIG. 8 illustrates an example of a baseband processor architecture for a UE, according to some embodiments.

FIGS. 7A, 7B and 8: 5G Core Network Architecture—Interworking with Wi-Fi In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106.

In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF706a and the SMF 706b of the 5G CN. The AMF 706 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods to improve security checks in a 5G NR network, including mechanisms pairing/unpairing UAVs to/from UAV controllers, e.g., as further described herein.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods pairing/unpairing UAVs to/from UAV controllers, e.g., as further described herein.

Figure 9:
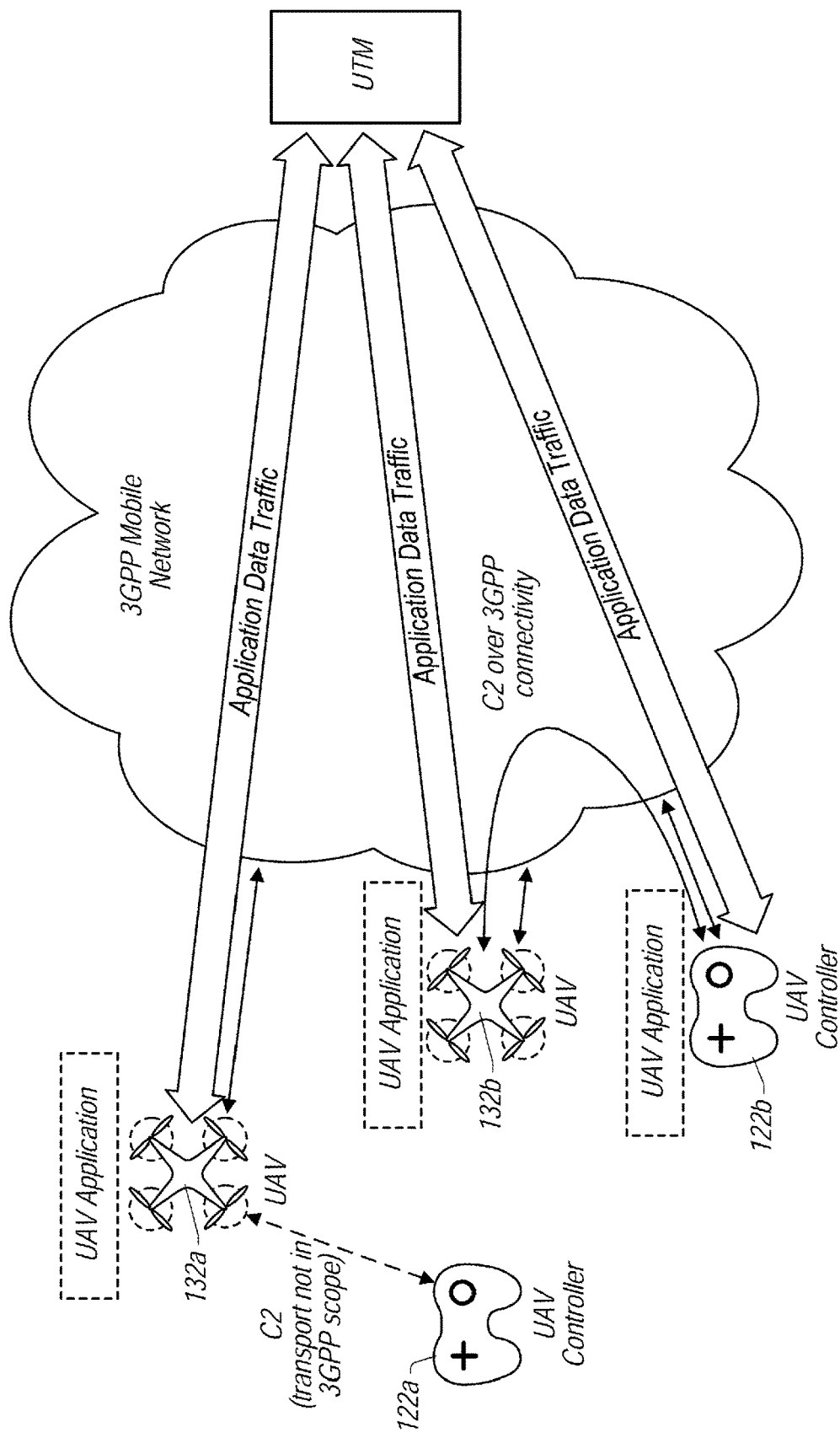
FIG. 9 illustrates an unmanned aerial system operating in a cellular network, such as a 3GPP network, according to some embodiments.
Figure 10:
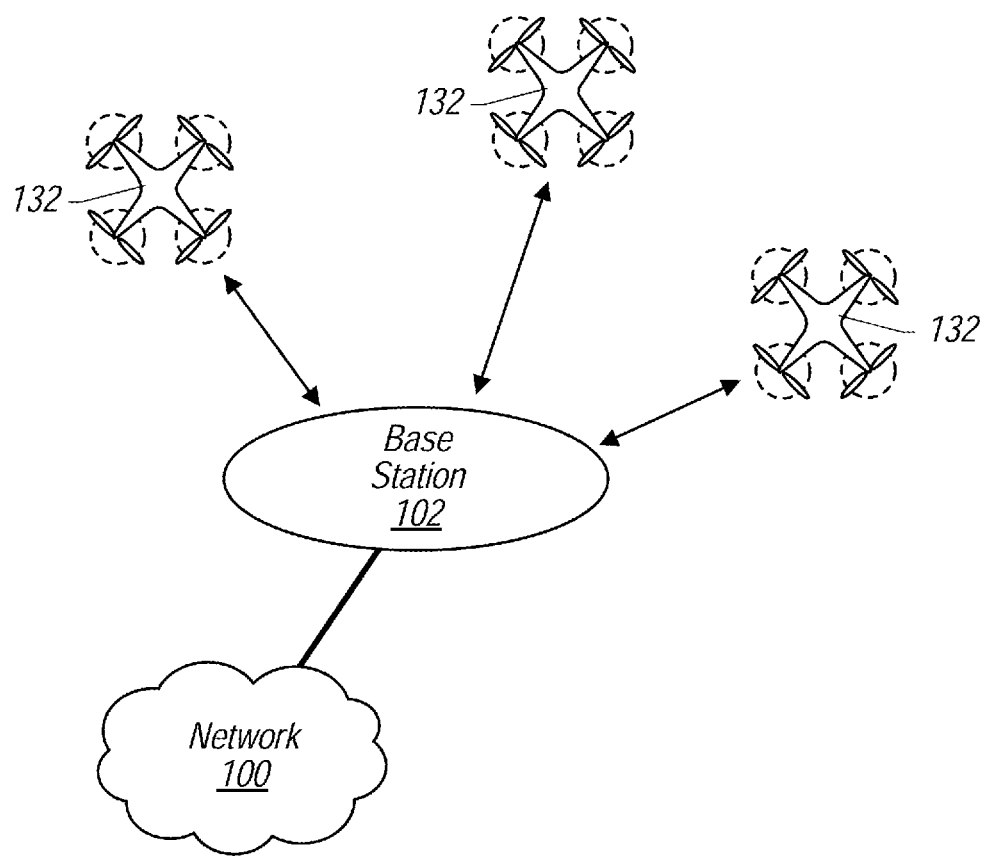
FIG. 10 illustrates a base station in communication with a UAV, according to some embodiments.

FIGS. 9-10: Unmanned Aerial System

FIG. 9 illustrates an example (and simplified) block diagram of unmanned aerial system (UAS) in which aspects of this disclosure may be implemented, according to some embodiments. It is noted that the system of FIG. 9 is merely one example of a possible system, and embodiments may be implemented in any of various systems, as desired.

As shown, the example UAS includes one or more unmanned aerial vehicles (UAVs), a first UAV 132a and a second UAV 132b. The first UAV 132a may be controlled by a first UAV controller 122a operated by a user, and one or both of the first and second UAVs 132a and 132b may be controlled by a second UAV controller 122b operated by a user. The controllers 122a and 122b may transmit command and control (C2) signals to the UAV's to control their operation, e.g., to control their movement. Example C2 signals include signals to steer the UAV's, to move the UAV up or down, to adjust the speed of the UAV's, etc. Each of the UACs (controllers) may be implemented as a UE, such as UE 106 as described above.

When using the cellular network (3GPP network) as the transport network for supporting UAS services, the system may utilize one or more of three different C2 communication methods to provision UAS services, which may include guaranteeing QoS for the C2 communication. These three different C2 communication methods may be referred to as Direct C2 Communication, Network-Assisted C2 Communication, and UTM-Navigated C2 Communication. Each of these is described below.

Direct C2 Communication: The UAV controller and UAV establish a direct C2 link to communicate with each other and both are registered to the 5G network using a radio resource configured and scheduled provided by the 5G network for direct C2 communication. This is shown in the left side of FIG. 9, where in some implementations the first UAV controller 122a may communicate command and control (C2) radio signals directly with its respective UAV 132a, as indicated by the note "C2 transport not in 3GPP scope". Thus, the UAV controller 122a transmits radio signals that are received directly by the UAV 132a, and similarly the UAV 132a transmits radio signals that are received directly by the UAV controller 122a (direct C2 link). This method of direct communication between the controller 122a and the UAV 132a may be useable when the controller 122a and the UAV 132a are within line of sight of each other and are sufficiently close to one another. This would be a typical scenario where a user is controlling a drone that is close to the user (e.g., within short-range radio transmission range) and within the user's line of sight.

Network-Assisted C2 Communication: The UAV controller and UAV register and establish respective unicast C2 communication links to the cellular network (5G network) and communicate with each other via the cellular network. Also, both the UAV controller and UAV may be registered to the cellular network via different NG-RAN nodes. Here it is presumed that the cellular network supports a mechanism to handle the reliable routing of C2 communication. This is shown in the middle of FIG. 9, where the UAV controller 122b communicates C2 signals with its respective UAV 132b using a cellular network, as indicated by the note "C2 over 3GPP connectivity". Thus, as shown, the UAV controller 122b transmits command and control (C2) radio signals that are received by a cellular network (e.g., a base station 102 of a cellular network), and the cellular network then transmits corresponding C2 radio signals to one or both of the UAVs 132a and 132b. In a similar manner, one of the UAVs may transmit C2 radio signals that are received by the cellular network (e.g., a base station 102 of a cellular network), and the cellular network then transmits corresponding radio signals to one or both of the other UAV or to UAV controller 122b.

Thus, the first UAV controller 122a communicates with its UAV 132a using direct radio signaling (without using the cellular network) referred to as "Direct C2 Communication", while the second UAV controller 122b communicates with one or more UAVs (e.g., UAVs 132a and 132b) using an intermediate cellular network to facilitate the communication, referred to as "Network-Assisted C2 Communication".

UTM-Navigated C2 Communication: This communication method also utilizes the cellular network, where the UAV controller and UAV register and establish respective C2 communication links to the cellular network (5G network) and communicate with each other via the cellular network. In this method, the UAV may have an associated controller, but the UTM may be able to take control of the UAV at any time. The UAV may have been provided a pre-scheduled flight plan, e.g., an array of 4D polygons describing a path in the cellular network, for autonomous flying. In this communication method, the UTM maintains a C2 communication link with the UAV in order to regularly monitor the flight status of the UAV, verify the flight status with up-to-date dynamic restrictions, provide route updates, and navigate the UAV whenever necessary. Thus, the UTM may control the flight of the UAV, including the flight path, the height at which the UAV may travel, the speed of the UAV, etc. This is shown in FIG. 9 as the "Application Data Traffic" that is transmitted between the UAS Traffic Management (UTM) and each of the UAV 132a, UAV 132b and the controller 122b. The term "Application Data Traffic" in FIG. 9 may refer to command and control (C2) signals provided between the UTM and one or more of the UAV 132a, UAV 132b and the controller 122b. One example of where the UTM may take over UAV operations is when there is an attempt by the UAV and/or its controller to violate a previously approved flight authorization.

In general, Direct C2 communication and Network-Assisted C2 communication may be used by a human-operator using a UAV controller. UTM-Navigated C2 communication may be used by the UTM to provide cleared flying routes and routes updates, which may not involve a human operator. In other words, UTM-Navigated C2 communication may involve autonomous flying operation of the UAV. In order to ensure the service availability and reliability of the C2 communication for UAS operation, especially when the UAV is flying beyond line of sight (BLOS) of the operator, redundant C2 communication links can be established for any C2 communication links from the UAV controller or UTM to the UAV.

One or more, and preferably each, of the second UAV controller 122b, the UAC 122a, and the UAV 132b may store and execute UAV applications for performing a desired function, as shown. Accordingly, the second UAV controller 122b and the UAVs 132a and 132b may transmit application data traffic back and forth amongst each other using the cellular network.

The cellular network is conceptually illustrated as a cloud labeled "3GPP Mobile Network", although it is noted that any of various types of cellular networks may be used. The cellular network may include a plurality of base stations, where at least one base station 102 communicates over a wireless transmission medium with one or more (e.g., an arbitrary number of) UAVs and/or UAV controllers. The cellular network base stations may also be configured to communicate with various other cellular user equipment (UE) devices, such as cell phones, tablets, etc.

The base station 102 may be a base transceiver station (BTS) or cell site, and may include hardware and/or software that enables wireless communication with UEs, including UAVs and UAV controllers. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network (e.g., a core network of a cellular service provider, a telecommunication network such as a public switched telephone network (PSTN), and/or the Internet, among various possibilities). Thus, the base station 102 may facilitate communication among the various devices and the cellular network. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the cellular network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1xRTT, 1xEV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to cellular-equipped devices (such as UEs, UAVs, and UAV controllers) over a geographic area via one or more cellular communication standards.

The box labeled "UTM" refers to UAS Traffic Management, which may be implemented by a computer system, e.g., a server, or in "the cloud" outside of (e.g., "behind") the cellular network. Thus, a server may implement UTM (UAS Traffic Management) functionality (which may be a combination of hardware and software) for coordinating operation and data traffic between one or more of the UAVs and one or more of the UAV controllers. Thus, a server or other device implementing UTM functionality is shown in FIG. 10 as "UTM" for convenience. It is noted that each cellular network provider may implement its own UTM.

The unmanned aerial system (UAS) shown in FIG. 9 may at least partially operate according to the UAS reference model in 3GPP. In the 3GPP UAS reference model, a subset or all of the following may exist: 1) the UAS is composed of at least one UAV controller and one or more UAVs; 2) at least a subset of the UAVs are connected over cellular connectivity; 3) a UAV may be controlled by a UAV controller connected via a cellular network, such as the 3GPP mobile network; 4) a UAV may be controlled by a UAV controller not connected via the cellular network, e.g., using a non-cellular C2 interface; 5) a UAV controller connected via the cellular network (e.g., 3GPP mobile network) may control one or more UAV(s); and 6) the UAS may exchange application data traffic with a UTM.

FIG. 10 illustrates an example unmanned aerial equipment (UAV), e.g., UAV 132 in communication with the base station 102, according to some embodiments. The UAV 132 may be a device with wireless network connectivity such as cellular network connectivity, such as may be found in a UE, such as UE 106. The UAV 132 may include a processor (processing element) that is configured to execute program instructions stored in memory. The UAV 132 may perform any of the method embodiments described herein by executing such stored instructions. Alternatively, or in addition, the UAV 132 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UAV 132 may be configured to communicate using any of multiple wireless communication protocols. For example, the UAV 132 may be configured to communicate using two or more of CDMA2000, LTE, LTE-A, 5G NR, WLAN, or GNSS. Other combinations of wireless communication standards are also possible.

The UAV 132 may include a radio and one or more antennas for communicating using one or more wireless communication protocols according to one or more RAT standards. In some embodiments, the UAV 132 may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Figure 11:
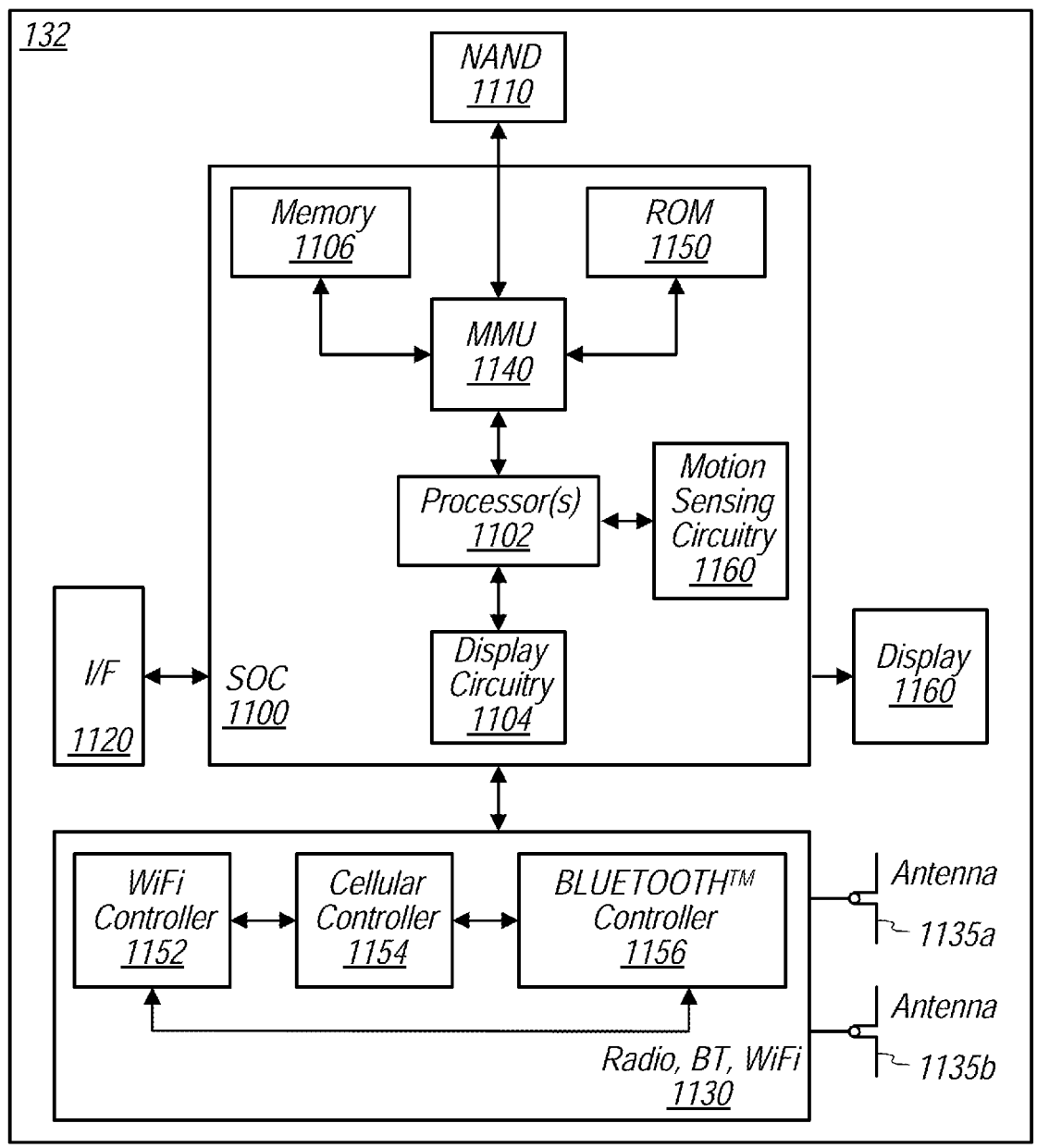
FIG. 11 illustrates an example block diagram of a UAV, according to some embodiments.

FIG. 11: Block Diagram of an Example UAV

FIG. 11 illustrates a block diagram of an exemplary UAV, such as the UAV 132, according to some embodiments. As shown, the UAV may include a processor or system on chip (SOC) 1100, which may include portions for various purposes. For example, as shown, the SOC 1100 may include processor(s) 1102 which may execute program instructions for the UAV. The processor(s) 1102 may be coupled to memory management unit (MMU) 1140, which may be configured to receive addresses from the processor(s) 1102 and translate those addresses to locations in memory (e.g., memory 1106, read only memory (ROM) 1150, NAND flash memory 1110) and/or to other circuits or devices, such as radio 1130, connector interface (I/F) 1120, various sensors such as video camera, etc. In some embodiments, the MMU 1140 may be included as a portion of the processor(s) 1102.

As shown, the SOC 1100 may be coupled to various other circuits of the UAV 132. For example, the UAV 132 may include various types of memory (e.g., including Flash 1110), a connector interface 1120 (e.g., for coupling to a charging station, etc., and wireless communication circuitry 1130 (e.g., for LTE, LTE-A, NR, CDMA2000, BLUETOOTH, Wi-Fi, GPS, etc.). The UAV may include at least one antenna (e.g. 1135a), and possibly multiple antennas (e.g. illustrated by antennas 1135a and 1135b), for performing wireless communication with base stations, controllers, and/or other devices. Antennas 1135a and 1135b are shown by way of example, and UAV 132 may include fewer or more antennas. Overall, the one or more antennas are collectively referred to as antenna 1135. For example, the UAV may use antenna 1135 to perform the wireless communication with the aid of radio circuitry 1130. As noted above, the UAV may be configured to communicate wirelessly using multiple wireless communication standards in some embodiments.

The UAV may include hardware and software components for implementing methods as described herein. The processor(s) 1102 of the UAV 132 may be configured to implement part or all of the methods described herein, e.g., by executing program instructions stored on a memory medium (e.g., a non-transitory computer-readable memory medium). In other embodiments, processor(s) 1102 may be configured as a programmable hardware element, such as an FPGA (Field Programmable Gate Array), or as an ASIC (Application Specific Integrated Circuit). Furthermore, processor(s) 1102 may be coupled to and/or may interoperate with other components as shown in FIG. 11, to perform the various embodiments disclosed herein. Processor(s) 1102 may also implement various other applications and/or end-user applications running on UAV.

In some embodiments, radio 1130 may include separate controllers dedicated to controlling communications for various respective RAT standards. For example, as shown in FIG. 11, radio 1130 may include a Wi-Fi controller 1152, a cellular controller (e.g. LTE and/or LTE-A controller) 1154, and BLUETOOTH™ controller 1156, and in at least some embodiments, one or more or all of these controllers may be implemented as respective integrated circuits (ICs or chips, for short) in communication with each other and with SOC 1100 (and more specifically with processor(s) 1102). While three separate controllers are illustrated within radio 1130, other embodiments have fewer or more similar controllers for various different RATs that may be implemented in UAV.

Figure 12:
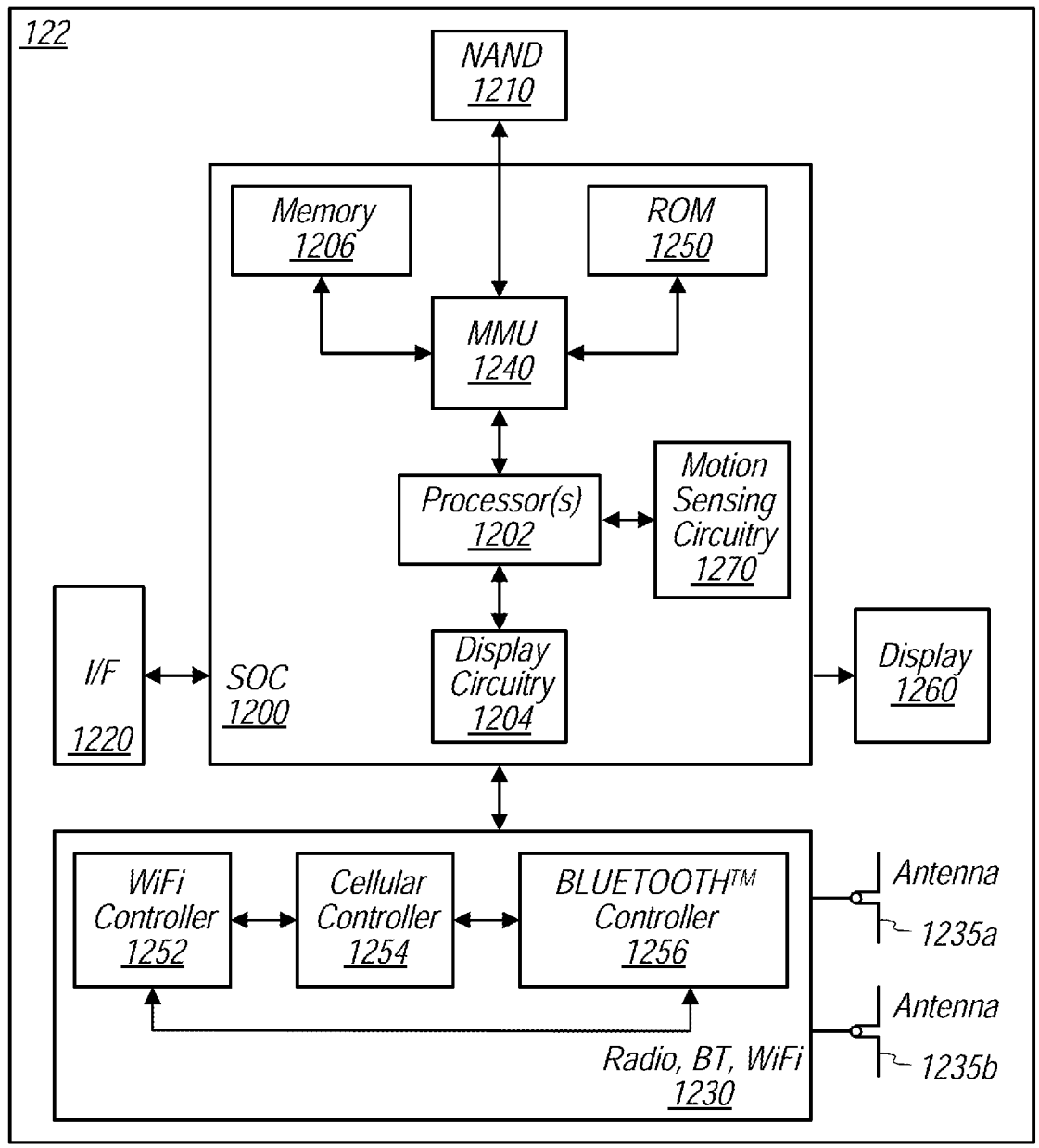
FIG. 12 illustrates an example block diagram of a UAC, according to some embodiments.

FIG. 12: Block Diagram of an Example UAC

FIG. 12 illustrates a block diagram of an exemplary UAC, such as the UAC 122, according to some embodiments. As shown, the UAC may include a processor or system on chip (SOC) 1200, which may include portions for various purposes. For example, as shown, the SOC 1200 may include processor(s) 1202 which may execute program instructions for the UAC. The processor(s) 1202 may be coupled to memory management unit (MMU) 1240, which may be configured to receive addresses from the processor(s) 1202 and translate those addresses to locations in memory (e.g., memory 1206, read only memory (ROM) 1250, NAND flash memory 1210) and/or to other circuits or devices, such as radio 1230, connector interface (I/F) 1220, various sensors such as video camera, etc. In some embodiments, the MMU 1240 may be included as a portion of the processor(s) 1202.

As shown, the SOC 1200 may be coupled to various other circuits of the UAC 122. For example, the UAC 122 may include various types of memory (e.g., including Flash 1210), a connector interface 1220 (e.g., for coupling to a charging station, etc., and wireless communication circuitry 1230 (e.g., for LTE, LTE-A, NR, CDMA2000, BLUETOOTH™, Wi-Fi, GPS, etc.). The UAC may include at least one antenna (e.g. 1235a), and possibly multiple antennas (e.g. illustrated by antennas 1235a and 1235b), for performing wireless communication with base stations, controllers, and/or other devices. Antennas 1235a and 1235b are shown by way of example, and UAC 122 may include fewer or more antennas. Overall, the one or more antennas are collectively referred to as antenna 1235. For example, the UAC may use antenna 1235 to perform the wireless communication with the aid of radio circuitry 1230. As noted above, the UAC may be configured to communicate wirelessly using multiple wireless communication standards in some embodiments.

The UAC may include hardware and software components for implementing methods as described herein. The processor(s) 1202 of the UAC 122 may be configured to implement part or all of the methods described herein, e.g., by executing program instructions stored on a memory medium (e.g., a non-transitory computer-readable memory medium). In other embodiments, processor(s) 1202 may be configured as a programmable hardware element, such as an FPGA (Field Programmable Gate Array), or as an ASIC (Application Specific Integrated Circuit). Furthermore, processor(s) 1202 may be coupled to and/or may interoperate with other components as shown in FIG. 12, to perform the various embodiments disclosed herein. Processor(s) 1202 may also implement various other applications and/or end-user applications running on UAC.

In some embodiments, radio 1230 may include separate controllers dedicated to controlling communications for various respective RAT standards. For example, as shown in FIG. 12, radio 1230 may include a Wi-Fi controller 1252, a cellular controller (e.g. LTE and/or LTE-A controller) 1254, and BLUETOOTH™ controller 1256, and in at least some embodiments, one or more or all of these controllers may be implemented as respective integrated circuits (ICs or chips, for short) in communication with each other and with SOC 1200 (and more specifically with processor(s) 1202). While three separate controllers are illustrated within radio 1230, other embodiments have fewer or more similar controllers for various different RATs that may be implemented in UAC.

UAC and UAV Association

Embodiments described herein provide systems, methods, and mechanisms for association of an unmanned aerial vehicle (UAV) controller (UAC) to one or more UAVs such that the UAC and the one or more UAVs are considered an unmanned aerial system (UAS), e.g., to enable UAS traffic management (UTM) flight mission authorization for the UAS. Additionally, embodiments described herein further define network (e.g., 3GPP system) involvement in the association of the UAC to the one or more UAVs. Further, embodiments described herein relate to scenarios in which a UAV, such as UAV 132, needs to (and/or determines/decides to) unpair (e.g., disassociate) from a first (e.g., host) UAC, such as a first UAC 122, and pair (e.g., associate) to a second (e.g., target) UAC, such as a second UAC 122. Note that some embodiments may presume that:

(a) the UAV, the first UAC, and the second UAC are each authorized and registered to a 5G core network (5GC);

(b) the UAV and the first UAC have been considered as a UAS (e.g., have been associated/paired with one another) by a UTM; and (c) the second UAC is authorized by the UTM.

For example, a UTM may request to unpair the UAV from the host UAC, e.g., a network side initiation that may result in the UAV and the host UAC no longer being considered a UAS by the UTM. As another example, a UTM may requests to pair the UAV and the target UAC, e.g., a network side initiation that results in the UAV and the target UAC being considered as a UAS by the UTM. As further examples, the host UAC may request to disassociate (e.g., unpair) from the UAV and/or the target UAC may request to associate (e.g., pair) with the UAV. As yet other examples, the UAV may request to disassociate (e.g., unpair) from the host UAC and/or the UAV may request to associate (e.g., pair) with the target UAC.

Figure 13A:
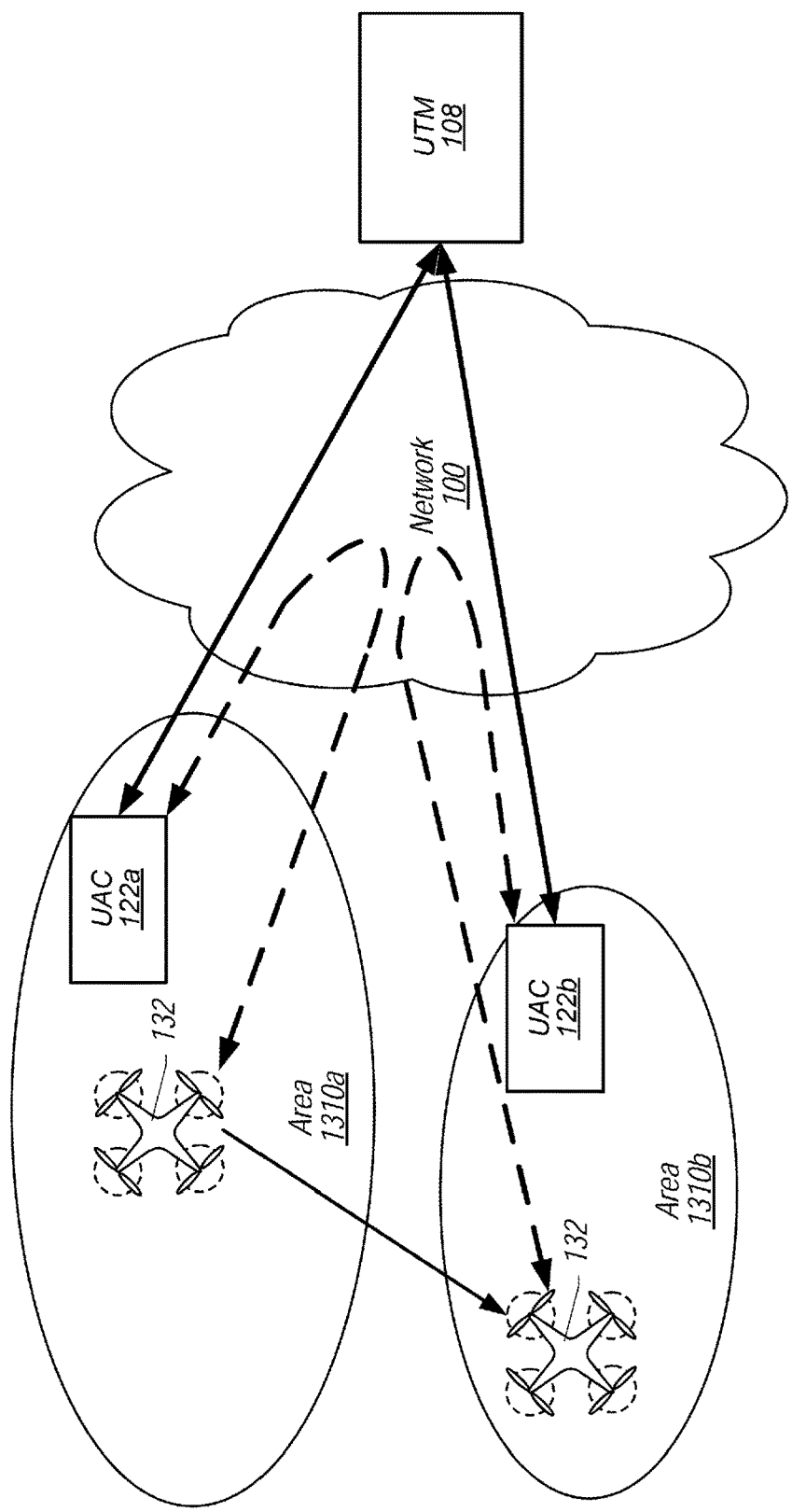
FIG. 13A illustrates an example of a UTM initiated handover of a UAV from a first UAC to a second UAC, according to some embodiments.

In some embodiments, a network may initiate UAV/UAC association procedures (e.g., pairing and/or unpairing of UAVs and UACs). For example, as illustrated by FIG. 13A, a UTM, such as UTM 108, may request to unpair UAV 132 from (host) UAC 122a and pair UAV 132 to (target) UAC 122b as UAV 132 moves from area 1310a to area 1310b, as shown. In other words, the UTM may initiate UAC handover based on area locations covered by each UAC, e.g., based, at least in part, on a mapping table, such as the example mapping table illustrated by FIG. 13B. For example, UAV 132 may initially be paired (e.g., associated) with UAC 122a, e.g., while the UAV 132 is within area 1310a, UAC 122a may be considered a host UAC and control UAV 132 via at least one of Direct C2 Communication, Network-Assisted C2 Communication, and/or UTM-Navigated C2 Communication. In some embodiments, UTM 108 may maintain a mapping table, such as the mapping table illustrated by FIG. 13B, for UACs and designated areas. Further, in some embodiments, UTM 108 may monitor (e.g., track) a location of UAV 132. Thus, when UAV 132 is in area 1310a, which may be designated as a control area of UAC 122a (e.g., based on a mapping table, such as the mapping table illustrated by FIG. 13B), the UTM may associate (e.g., pair). UAV 132 to UAC 122a. Then, as UAV 132 moves from area 1310a to area 1310b, UTM 108 may initiate an unpairing (e.g., disassociation) of UAV 132 from UAC 122a and a pairing (e.g., association) of UAV 132 to UAC 122b. Thus, when UAV 132 is in area 1310b, which may be designated as a control of UAC 122b (e.g., based on a mapping table, such as the mapping table illustrated by FIG. 13B), the UAV 132 may be associated with UAC 122b.

Thus, in some embodiments, cases (scenarios) in which a UTM may trigger pairing (e.g., association) of a UAV to a UAC may include:

(1) control area based handover as a UAV moves from a first area controlled by a first UAC to a second area controlled by a second UAC;

(2) UAC service interruption in which a first (e.g., host) UAC has no service in an area and the UTM pairs the UAV to a second (e.g., target) UAC; and/or (3) new UAV registration and authorization by the UTM. Additionally, in some embodiments, cases (scenarios) in which a UTM may trigger unpairing (e.g., disassociation) of a UAV from a UAC may include:

(1) control area based handover as a UAV moves from a first area controlled by a first (e.g., host) UAC to a second area controlled by a second (e.g., target) UAC;

(2) restricted area based handover as a UAV under control of a first (e.g., host) UAC enters a restricted area and UTM triggers a handover to a second (e.g., target) UAC and/or another controlling entity; and/or (3) UAC/UAV traffic control area.

Note that in each case, the UTM may maintain a mapping table of control areas associated with particular UACs, e.g., as illustrated by FIG. 13B.

Figure 14:
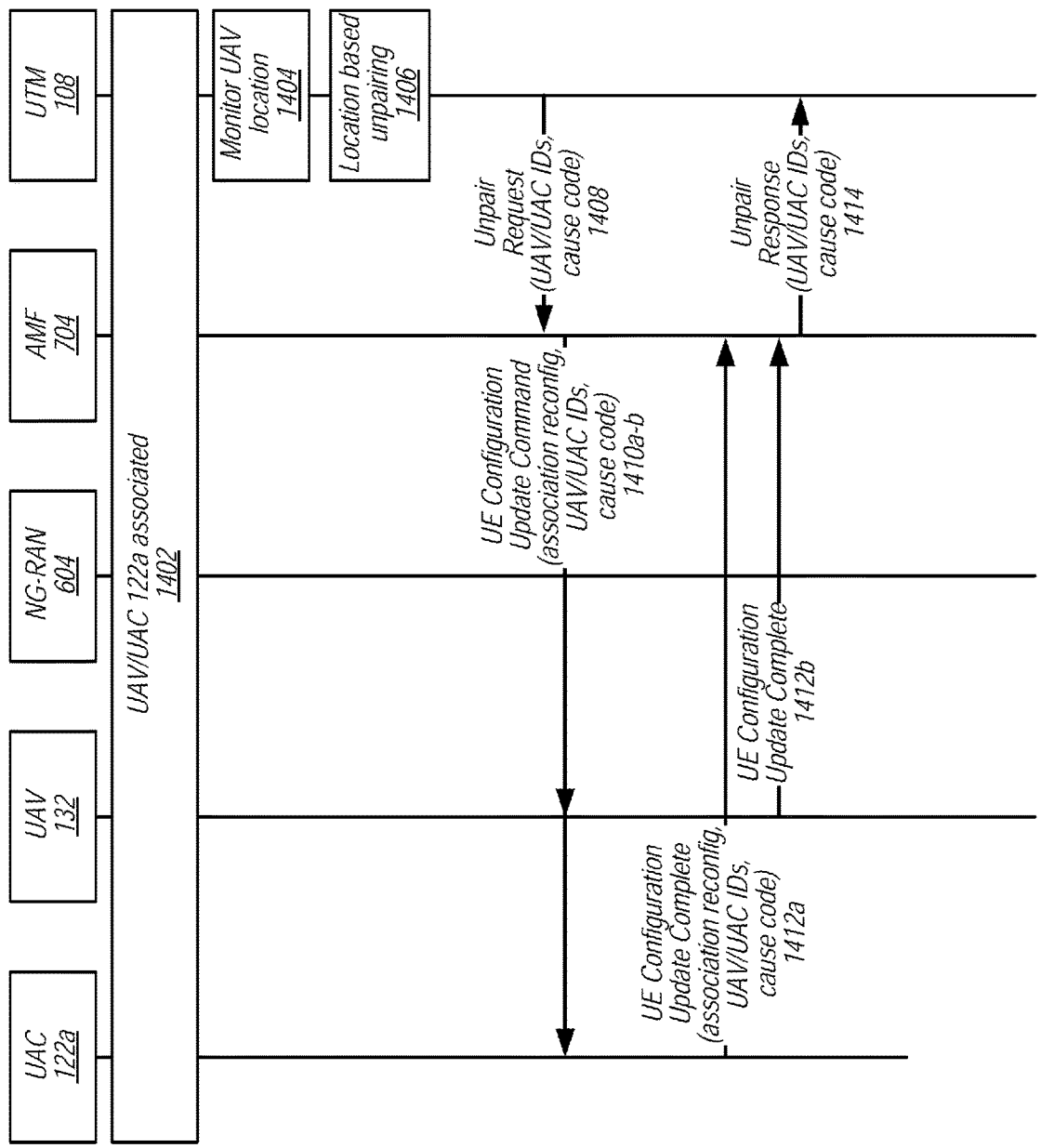
FIG. 14 illustrates an example of signaling for a UTM to request to unpair a UAV and a UAC, according to some embodiments.

FIGS. 14-17 illustrate examples of signaling for a UTM to request pairing/unpairing of a UAV from/to a UAC, according to some embodiments. For example, FIG. 14 illustrates an example of signaling for a UTM to request to unpair a UAV and a (host) UAC, according to some embodiments. The signaling shown in FIG. 14 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 1402, UAV 132 and UAC 122a may be associated with one another and considered as a UAS by UTM 108. Thus, UAC 122a may be considered a host UAC of UAV 132. In other words, once UAC 122a is associated with UAV 132, UAC 122a may be considered as a host UAC of UAV 132. In some embodiments, UAC 122a may control UAV 132 via at least one C2 communication method, such as at least one of Direct C2 Communication, Network-Assisted C2 Communication, and/or UTM-Navigated C2 Communication.

At 1404, UTM 108 may monitor a location of UAV 132, e.g., with respect to mapped control regions. For example, UTM 108 may track location of UAV 132 with respect to one or more mapped control regions. In some embodiments, location tracking may include UTM 108 receiving location updates from UAV 132 and/or UAC 122a. In some embodiments, location tracking may include UTM 108 monitoring location of UAV 132 via one or more of cellular signals received from UAV 132, cellular signals received from UAC 122a, global positioning signals received from UAV 132, global positioning signals associated with UAV 132 received from UAC 122a, and/or other signals received from UAV 132 and/or UAC 122a. Note that in some embodiments, UTM 108 receiving information from UAV 132 and/or UAC 122a may include one or more intermediary nodes (e.g., such as NG RAN 604 (e.g., one or more base stations 102 of NG RAN 604 and/or AMF 704) receiving information from UAV 132 and/or UAC 122a and forwarding the information to UTM 108, e.g., either directly and/or via one or more intermediary nodes.

At 1406, UTM 108 may decide to unpair UAV 132 from UAC 122a, e.g., based on determining that UAV 132 is leaving an area designated (e.g., by a mapping table accessible by UTM 108) as being under control of UAC 122a and entering an area in which UAC 122a does not have control, such as a restricted area and/or an area designated (e.g., by a mapping table accessible by UTM 108) as being under control of another UAC. In some embodiments, a restricted area may be defined as (and/or considered as) an area in which UAC 122a is not allowed (e.g., due to third party and/or governmental restrictions) to control UAV 132.

UTM 108 may then initiate an unpairing procedure, e.g., by sending unpair request message 1408 to AMF 704. The unpair request message 1408 may include a UAV identifier (ID), a UAC ID, and/or a UAS ID. Additionally, in some embodiments, the unpair request message 1408 may include a cause code (e.g., a code describing a reason for the unpair request). AMF 704 may, based on receiving the unpair request message 1408, send a UE configuration update command message 1410a to UAC 122a and a UE configuration update command message 1410b to UAV 132. The configuration update command messages 1410a and 1410b may each include an indication of the unpairing (e.g., an association reconfiguration), the cause code, and/or the UAV ID, the UAC ID, and/or the UAS ID. UAC 122a and UAV 132 may each send a UE configuration update complete message 1412 (e.g., UE configuration update complete messages 1412a and 1412b) to AMF 704. Note that in some embodiments, a message from either of UAC 122 or UAV 132 may be sufficient to complete the unpair procedure. The UE configuration update complete messages 1412a and 1412b may each include an indication that the unpairing is complete (e.g., an association reconfiguration complete), the cause code, and/or the UAV ID, the UAC ID, and/or the UAS ID. AMF 704, based on receiving the UE configuration update complete messages 1412a and 1412b, may send an unpair response message 1414 to UTM 108. The unpair response message 1414 may include the cause code as well as the UAV ID, the UAC ID, and/or the UAS ID, thereby completing the unpairing procedure.

Figure 15:
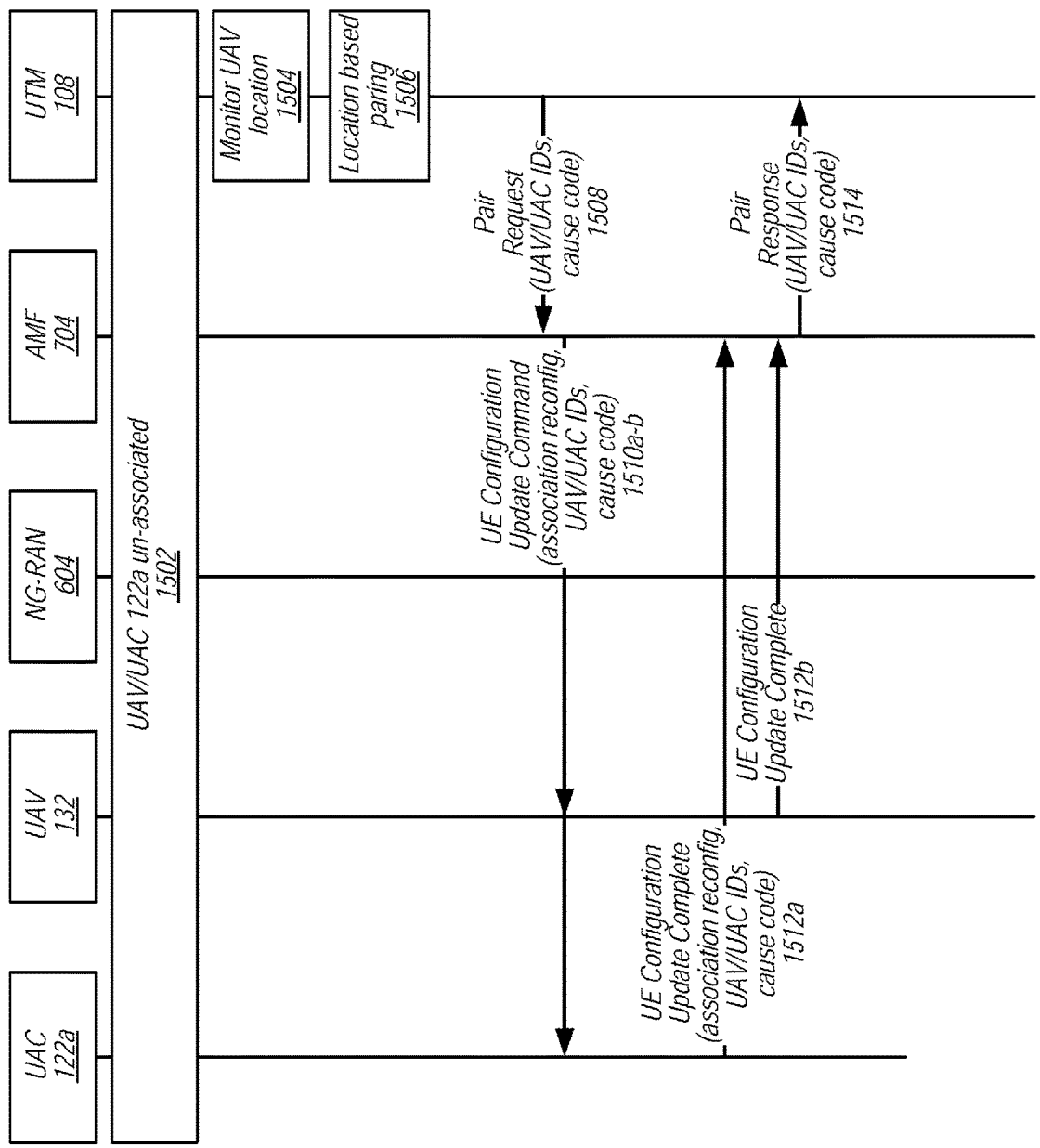
FIG. 15 illustrates an example of signaling for a UTM to request to pair a UAV and a UAC, according to some embodiments.

As another example, FIG. 15 illustrates an example of signaling for a UTM to request to pair a UAV and a (target) UAC, according to some embodiments. The signaling shown in FIG. 15 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 1502, UAV 132 and UAC 122a may be unassociated with one another and not considered as a UAS by UTM 108. However, UTM 108 may consider UAC 122a a target UAC for UAV 132, e.g., based on a location (and/or position) and/or flight path of UAV 132.

At 1504, UTM 108 may monitor a location of UAV 132, e.g., with respect to mapped control regions. For example, UTM 108 may track location of UAV 132 with respect to one or more mapped control regions. In some embodiments, location tracking may include UTM 108 receiving location updates from UAV 132 and/or a host UAC of UAV 132. In some embodiments, location tracking may include UTM 108 monitoring location of UAV 132 via one or more of cellular signals received from UAV 132, cellular signals received from the host UAC, global positioning signals received from UAV 132, global positioning signals associated with UAV 132 received from the host UAC, and/or other signals received from UAV 132 and/or the host UAC. Note that in some embodiments, UTM 108 receiving information from UAV 132 and/or UAC 122a may include one or more intermediary nodes (e.g., such as NG RAN 604 (e.g., one or more base stations 102 of NG RAN 604 and/or AMF 704) receiving information from UAV 132 and/or UAC 122a and forwarding the information to UTM 108, e.g., either directly and/or via one or more intermediary nodes.

At 1506, UTM 108 may decide to pair UAV 132 to UAC 122a, e.g., based on determining that UAV 132 is entering an area designated as being under control of UAC 122a (e.g., based on a mapping table accessible by UTM 108).

UTM 108 may then initiate a pairing procedure, e.g., by sending pair request message 1508 to AMF 704. The pair request message 1508 may include a UAV identifier (ID), a UAC ID (e.g., of the host UAC and/or of UAC 122a), and/or a UAS ID. Additionally, in some embodiments, the pair request message 1508 may include a cause code (e.g., a code describing a reason for the pair request). AMF 704 may, based on receiving the pair request message 1508, send a UE configuration update command message 1510a to UAC 122a and a UE configuration update command message 1510b to UAV 132. The configuration update command messages 1510a and 1510b may each include an indication of the pairing (e.g., an association reconfiguration), the cause code, and/or the UAV ID, the UAC ID (e.g., of the host UAC and/or of UAC 122a), and/or the UAS ID. UAC 122a and UAV 132 may each send a UE configuration update complete message 1512 (e.g., UE configuration update complete messages 1512a and 1512b) to AMF 704. Note that in some embodiments, a message from either of UAC 122 or UAV 132 may be sufficient to complete the pair procedure. The UE configuration update complete messages 1512*a* and 1512*b* may each include an indication that the pairing is complete (e.g., an association reconfiguration complete), the cause code, and/or the UAV ID, the UAC ID, and/or the UAS ID.AMF 704, based on receiving the UE configuration update complete messages 1512*a* and 1512*b*, may send a pair response message 1514 to UTM 108. The pair response message 1514 may include the cause code as well as the UAV ID, the UAC ID, and/or the UAS ID, thereby completing the pairing procedure.

Figure 16:
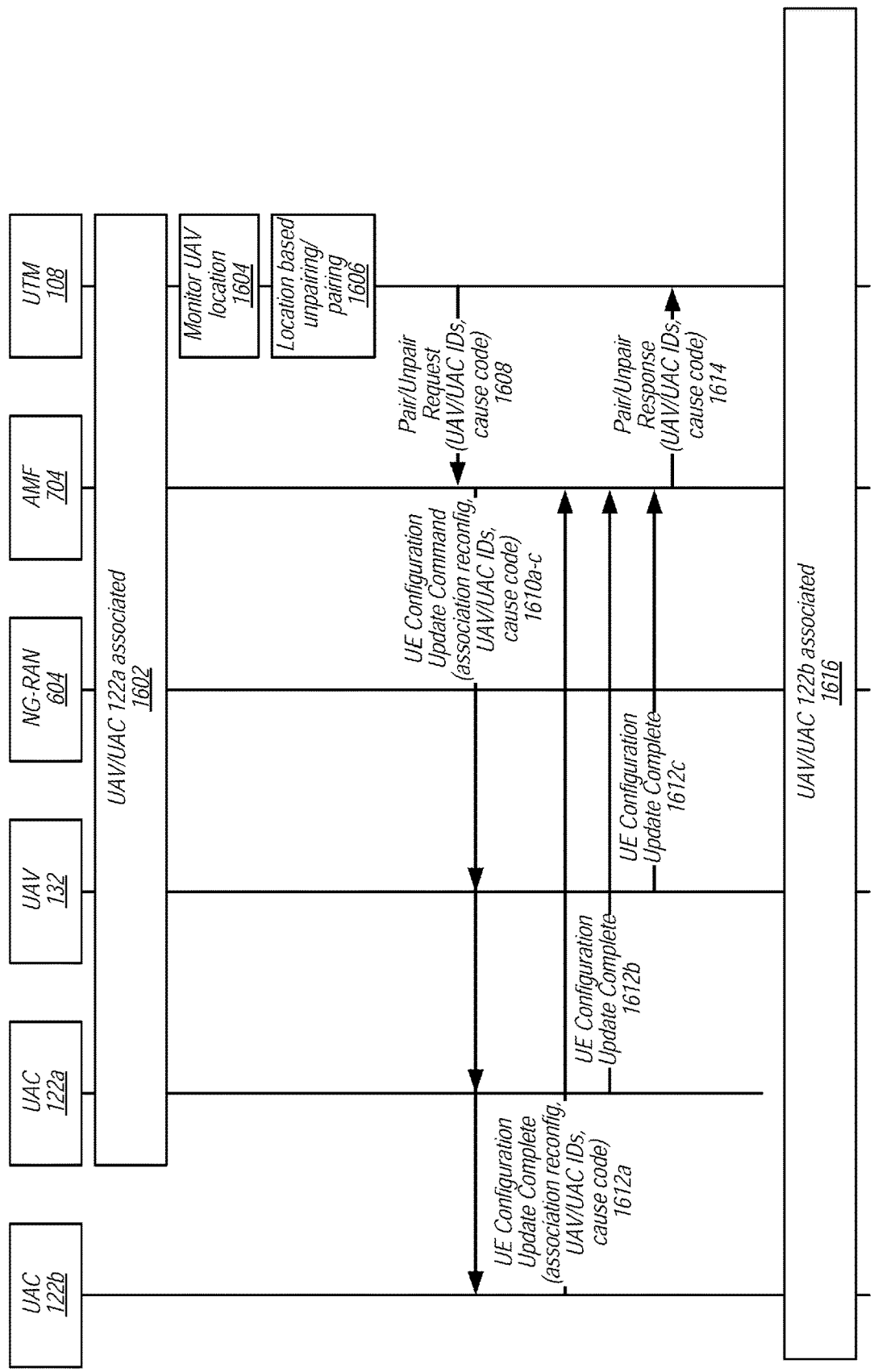
FIG. 16 illustrates an example of signaling for a UTM to request to unpair a UAV from a host (or first) UAC and pair the UAV to a target (or second) UAC, according to some embodiments.

As another example, FIG. 16 illustrates an example of signaling for a UTM to request to unpair a UAV from a host (or first) UAC and pair the UAV to a target (or second) UAC, according to some embodiments. The signaling shown in FIG. 16 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 1602, UAV 132 and UAC 122*a* (e.g., a host UAC) may be associated with one another and considered as a UAS by UTM 108. Thus, UAC 122*a* may be considered a host UAC of UAV 132. In other words, once UAC 122*a* is associated with UAV 132, UAC 122*a* may be considered as a host UAC of UAV 132. In some embodiments, UAC 122*a* may control UAV 132 via at least one C2 communication method, such as at least one of Direct C2 Communication, Network-Assisted C2 Communication, and/or UTM-Navigated C2 Communication.

At 1604, UTM 108 may monitor a location of UAV 132, e.g., with respect to mapped control regions. For example, UTM 108 may track location of UAV 132 with respect to one or more mapped control regions. In some embodiments, location tracking may include UTM 108 receiving location updates from UAV 132 and/or UAC 122*a*. In some embodiments, location tracking may include UTM 108 monitoring location of UAV 132 via one or more of cellular signals received from UAV 132, cellular signals received from UAC 122*a*, global positioning signals received from UAV 132, global positioning signals associated with UAV 132 received from UAC 122*a*, and/or other signals received from UAV 132 and/or UAC 122*a*. Note that in some embodiments, UTM 108 receiving information from UAV 132 and/or UAC 122*a* may include one or more intermediary nodes (e.g., such as NG RAN 604 (e.g., one or more base stations 102 of NG RAN 604 and/or AMF 704) receiving information from UAV 132 and/or UAC 122*a* and forwarding the information to UTM 108, e.g., either directly and/or via one or more intermediary nodes.

At 1606, UTM 108 may decide to unpair UAV 132 from UAC 122*a* (e.g., the host UAC), e.g., based on determining that UAV 132 is leaving an area designated (e.g., by a mapping table accessible by UTM 108) as being under control of UAC 122*a* and entering an area in which UAC 122*a* does not have control, such as a restricted area and/or an area designated (e.g., by a mapping table accessible by UTM 108) as being under control of another UAC. In some embodiments, a restricted area may be defined as (and/or considered as) an area in which UAC 122*a* is not allowed (e.g., due to third party and/or governmental restrictions) to control UAV 132. Additionally, UTM 108 may decide to pair UAV 132 to 122*b* (e.g., a target UAC), e.g., based on determining that UAV 132 is entering an area designated as being under control of UAC 122*b* (e.g., based on a mapping table accessible by UTM 108).

UTM 108 may then initiate the pairing/unpairing procedures, e.g., by sending pair/unpair request message 1608 to AMF 704. The pair/unpair request message 1608 may include a UAV identifier (ID), UAC IDs (e.g., of a host UAC, such as UAC 122*a*, and a target UAC, such as UAC 122*b*), and/or a UAS ID. Additionally, in some embodiments, the pair/unpair request message 1608 may include a cause code (e.g., a code describing a reason for the pair/unpair request). AMF 704 may, based on receiving the pair/unpair request message 1608, send a UE configuration update command message 1610*a* to UAC 122*a*, a UE configuration update command message1610*b* to UAC 122*b*, and a UE configuration update command message 1610*c* to UAV 132. The configuration update command messages 1610*a-c* may each include an indication of the pairing/unpairing (e.g., an association reconfiguration), the cause code, and/or the UAV ID, the UAC IDs, and/or the UAS ID. UAC 122*a*, UAC 122*b*, and UAV 132 may each send a UE configuration update complete message 1612 (e.g., UE configuration update complete messages 1612*a-c*) to AMF 704. Note that in some embodiments, messages from UAC 122*a* may not be necessary to complete the pair/unpair procedure. Note further, that in some embodiments, a message from either of UAC 122*b* or UAV 132 may be sufficient to complete the pair/unpair procedure. The UE configuration update complete messages 1612*a-c* may each include an indication that the pairing and/or unpairing is complete (e.g., an association reconfiguration complete), the cause code, and/or the UAV ID, the UAC IDs, and/or the UAS ID.AMF 704, based on receiving the UE configuration update complete messages 1612*a-c*, may send a pair/unpair response message 1614 to UTM 108. The pair response message 1614 may include the cause code as well as the UAV ID, the UAC IDs, and/or the UAS ID. At 1616, UAV 132 and second UAC 122*b* may be associated with one another and considered as a UAS by UTM 108, thereby completing the pair/unpair procedure. Thus, UAC 122*b* may now be considered a host UAC of UAV 132. In other words, once UAC 122*b* is associated with UAV 132, UAC 122*b* may be considered as a host UAC of UAV 132. In some embodiments, UAC 122*b* may control UAV 132 via at least one C2 communication method, such as at least one of Direct C2 Communication, Network-Assisted C2 Communication, and/or UTM-Navigated C2 Communication.

Figure 17:
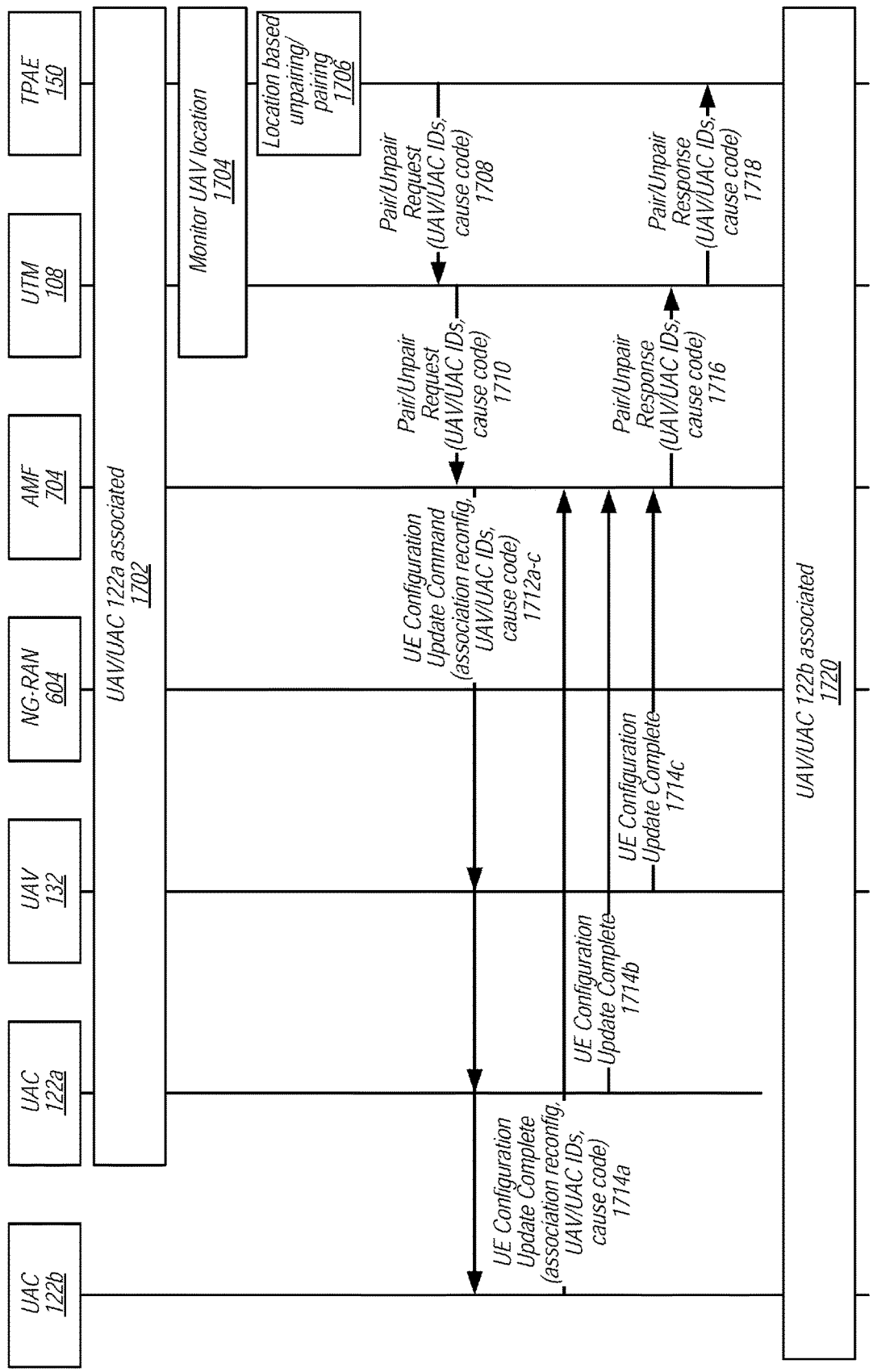
FIG. 17 illustrates an example of signaling for a TPAE to request to unpair a UAV from a host (or first) UAC and pair the UAV to a target (or second) UAC, according to some embodiments.

As yet another example, FIG. 17 illustrates an example of signaling for a TPAE to request to unpair a UAV from a host (or first) UAC and pair the UAV to a target (or second) UAC, according to some embodiments. The signaling shown in FIG. 17 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 1702, UAV 132 and UAC 122*a* (e.g., a host UAC) may be associated with one another and considered as a UAS by UTM 108 and Third Party Authorized Entity (TPAE) 150 (e.g., a government controlled/defined function for monitoring UAV activities within the government's territories/airspace). Thus, UAC 122*a* may be considered a host UAC of UAV 132. In other words, once UAC 122*a* is associated with UAV 132, UAC 122*a* may be considered as a host UAC of UAV 132. In some embodiments, UAC 122*a* may control UAV 132 via at least one C2 communication method, such as at least one of Direct C2 Communication, Network-Assisted C2 Communication, and/or UTM-Navigated C2

Communication. In some embodiments, the TPAE may be implemented by a computer system, e.g., a server, or in "the cloud" outside of (e.g., "behind") the cellular network and/or outside of (e.g., "behind") the UTM. Thus, a server may implement TPEA functionality (which may be a combination of hardware and software) for coordinating operation and data traffic between one or more of the UAVs and one or more of the UAV controllers, e.g., via instructions provided to a UTM.

At 1704, TPAE 150 and UTM 108 may monitor a location of UAV 132, e.g., with respect to mapped control regions. For example, UTM 108 and/or TPAE 150 may track location of UAV 132 with respect to one or more mapped control regions. In some embodiments, location tracking may include UTM 108 and/or TPAE 150 receiving location updates from UAV 132 and/or UAC 122*a*. In some embodiments, location tracking may include UTM 108 and/or TPAE 150 monitoring location of UAV 132 via one or more of cellular signals received from UAV 132, cellular signals received from UAC 122*a*, global positioning signals received from UAV 132, global positioning signals associated with UAV 132 received from UAC 122*a*, and/or other signals received from UAV 132 and/or UAC 122*a*. Note that in some embodiments, UTM 108 receiving information from UAV 132 and/or UAC 122*a* may include one or more intermediary nodes (e.g., such as NG RAN 604 (e.g., one or more base stations 102 of NG RAN 604 and/or AMF 704) receiving information from UAV 132 and/or UAC 122*a* and forwarding the information to UTM 108, e.g., either directly and/or via one or more intermediary nodes. Note that in some embodiments, TPAE 150 receiving information from UAV 132 and/or UAC 122*a* may include one or more intermediary nodes (e.g., such as NG RAN 604 (e.g., one or more base stations 102 of NG RAN 604, AMF 704, and/or UTM 108) receiving information from UAV 132 and/or UAC 122*a* and forwarding the information to TPAE 150, e.g., either directly and/or via one or more intermediary nodes.

At 1706, TPAE 150 may decide to unpair UAV 132 from UAC 122*a*, e.g., based on determining that UAV 132 is leaving an area designated (e.g., by a mapping table accessible by UTM 108 and/or TPAE 150) as being under control of UAC 122*a* and entering an area in which UAC 122*a* does not have control, such as a restricted area and/or an area designated (e.g., by a mapping table accessible by UTM 108 and/or TPAE 150) as being under control of another UAC. In some embodiments, a restricted area may be defined as (and/or considered as) an area in which UAC 122*a* is not allowed (e.g., due to third party and/or governmental restrictions) to control UAV 132. Additionally, TPAE 150 may decide to pair UAV 132 to UAC 122*b* (e.g., a target UAC), e.g., based on determining that UAV 132 is entering an area designated as being under control of UAC 122*b* (e.g., based on a mapping table accessible by UTM 108 and/or TPAE 150).

TPAE 150 may then initiate the pairing/unpairing procedures, e.g., by sending pair/unpair request message 1708 to UTM 108. The pair/unpair request message 1708 may include a UAV identifier (ID), UAC IDs (e.g., of a host UAC, such as UAC 122*a*, and a target UAC, such as UAC 122*b*), and/or a UAS ID. Additionally, in some embodiments, the pair/unpair request message 1708 may include a cause code (e.g., a code describing a reason for the pair/unpair request). UTM 108 may, based on receiving the pair/unpair request message 1708, send the pair/unpair request to AMF 704 via pair/unpair request message 1710. The pair/unpair message 1710 may include a UAV identifier (ID), UAC IDs (e.g., of a host UAC, such as UAC 122*a*, and a target UAC, such as UAC 122*b*), and/or a UAS ID. Additionally, in some embodiments, the pair/unpair request message 1710 may include a cause code (e.g., a code describing a reason for the pair/unpair request) AMF 704, based on receiving the pair/unpair request message 1710, may send a UE configuration update command 1712 a to UAC 122*a*, a UE configuration update command message1712*b* to UAC 122*b*, and a UE configuration update command message1712*c* to UAV 132. The configuration update command messages 1712*a-c* may each include an indication of the pairing/unpairing (e.g., an association reconfiguration), the cause code, and/or the UAV ID, the UAC IDs, and/or the UAS ID. UAC 122*a*, UAC 122*b*, and UAV 132 may each send a UE configuration update complete message 1714 (e.g., UE configuration update complete messages 1714*a-c*) to AMF 704. Note that in some embodiments, messages from UAC 122*a* may not be necessary to complete the pair/unpair procedure. Note further, that in some embodiments, a message from either of UAC 122*b* or UAV 132 may be sufficient to complete the pair/unpair procedure. The UE configuration update complete messages 1714*a-c* may include an indication that the pairing and/or unpairing is complete (e.g., an association reconfiguration complete), the cause code, and/or the UAV ID, the UAC IDs, and/or the UAS ID. 0 704 may, based on receiving the U configuration update complete messages 1714*a-c*, send a pair/unpair response message 1716 to UTM 108. The pair response message 1716 may include the cause code as well as the UAV ID, the UAC IDs, and/or the UAS ID. UTM 108 may, based on receiving the pair/unpair response message 1716 from AMF 704, forward the pair/unpair response message 1716 to TPAE 150 via pair/unpair response message 1718. At 1720, UAV 132 and UAC 122*b* may be associated with one another and considered as a UAS by UTM 108 and TPAE 150, thereby completing the pair/unpair procedure. Thus, UAC 122*b* may now be considered a host UAC of UAV 132. In other words, once UAC 122*b* is associated with UAV 132, UAC 122*b* may be considered as a host UAC of UAV 132. In some embodiments, UAC 122*b* may control UAV 132 via at least one C2 communication method, such as at least one of Direct C2 Communication, Network-Assisted C2 Communication, and/or UTM-Navigated C2 Communication.

In some embodiments, cases (scenarios) in which a UAC/UAV may trigger pairing/unpairing (e.g., association/disassociate) of a UAV to/from a UAC may include UAC handover and/or UAV request. A UAC handover may be triggered by a loss of power by a UAC and/or by UAC detection of a UAV leaving an area controlled by the UAC and/or entering an area not controlled by the UAC (e.g., controlled by another UAC and/or a restricted area). A UAV may request handover to another UAC based on loss of signal to a current UAC.

Figure 18:
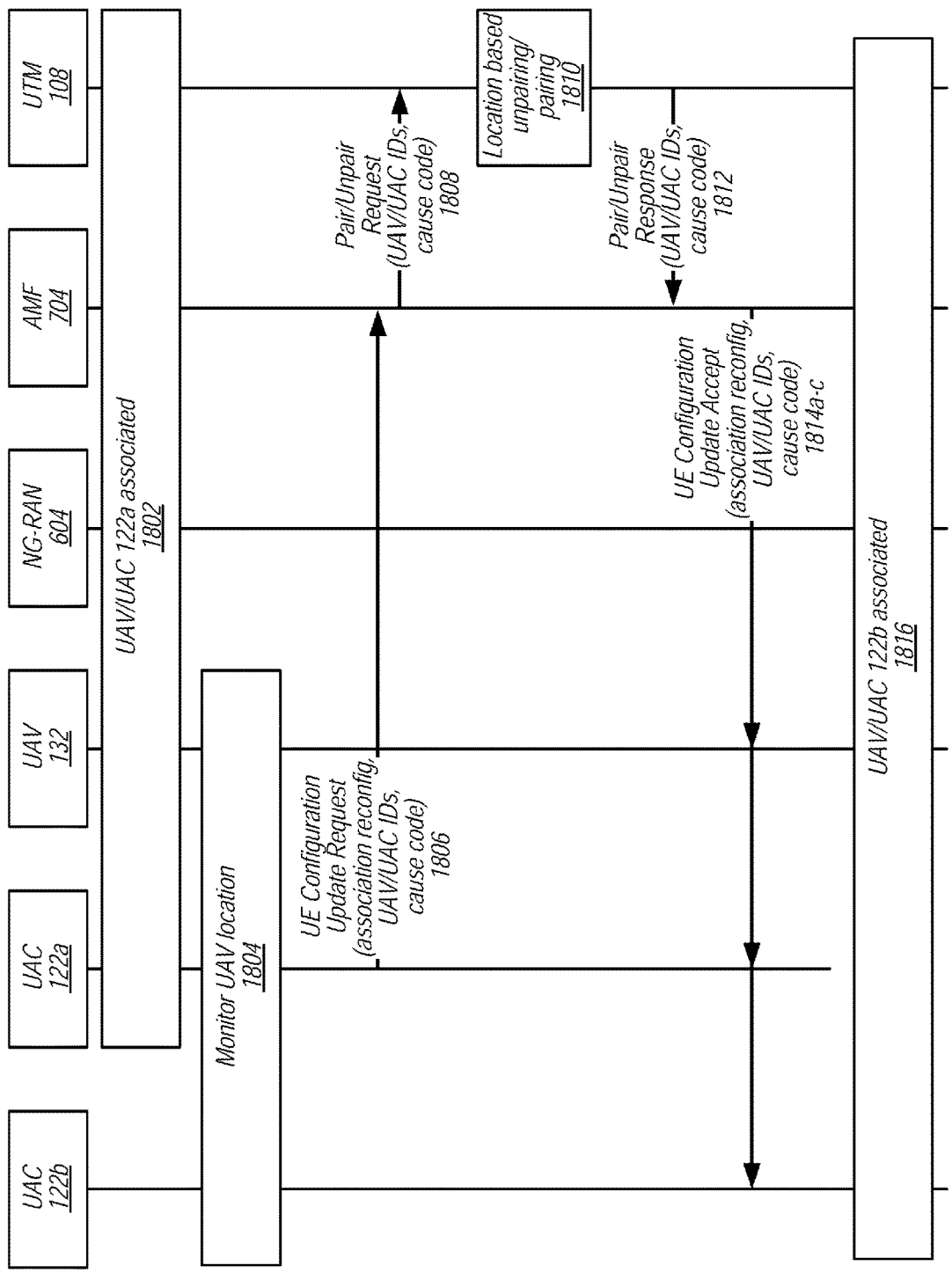
FIG. 18 illustrates an example of signaling for a host UAC to request to unpair from a UAV and to request that a target UAC pair to the UAV, according to some embodiments.
Figure 19:
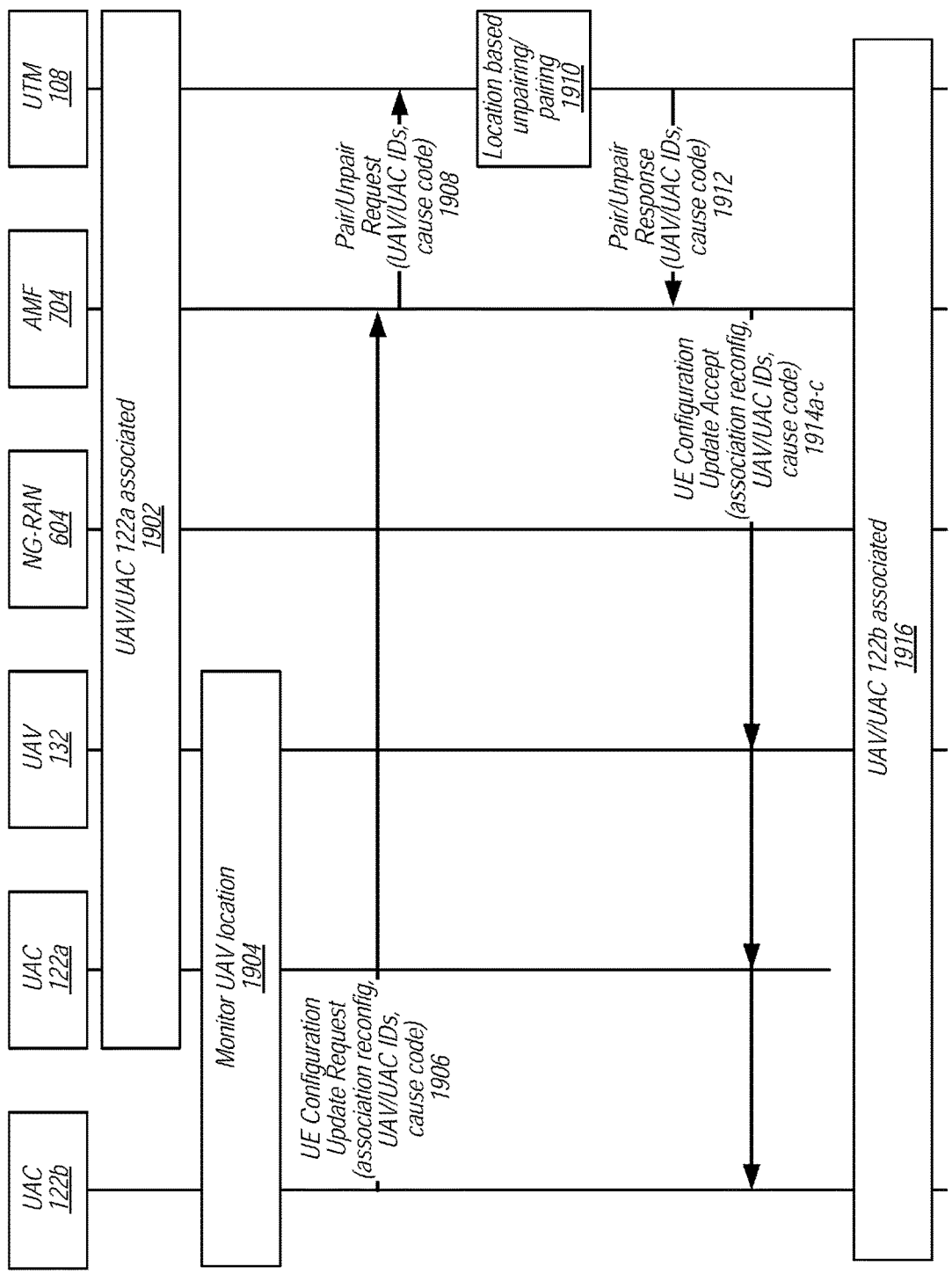
FIG. 19 illustrates an example of signaling for a target UAC to request that a host UAC unpair from a UAV and to request that the target UAC pair to the UAV, according to some embodiments.
Figure 20:
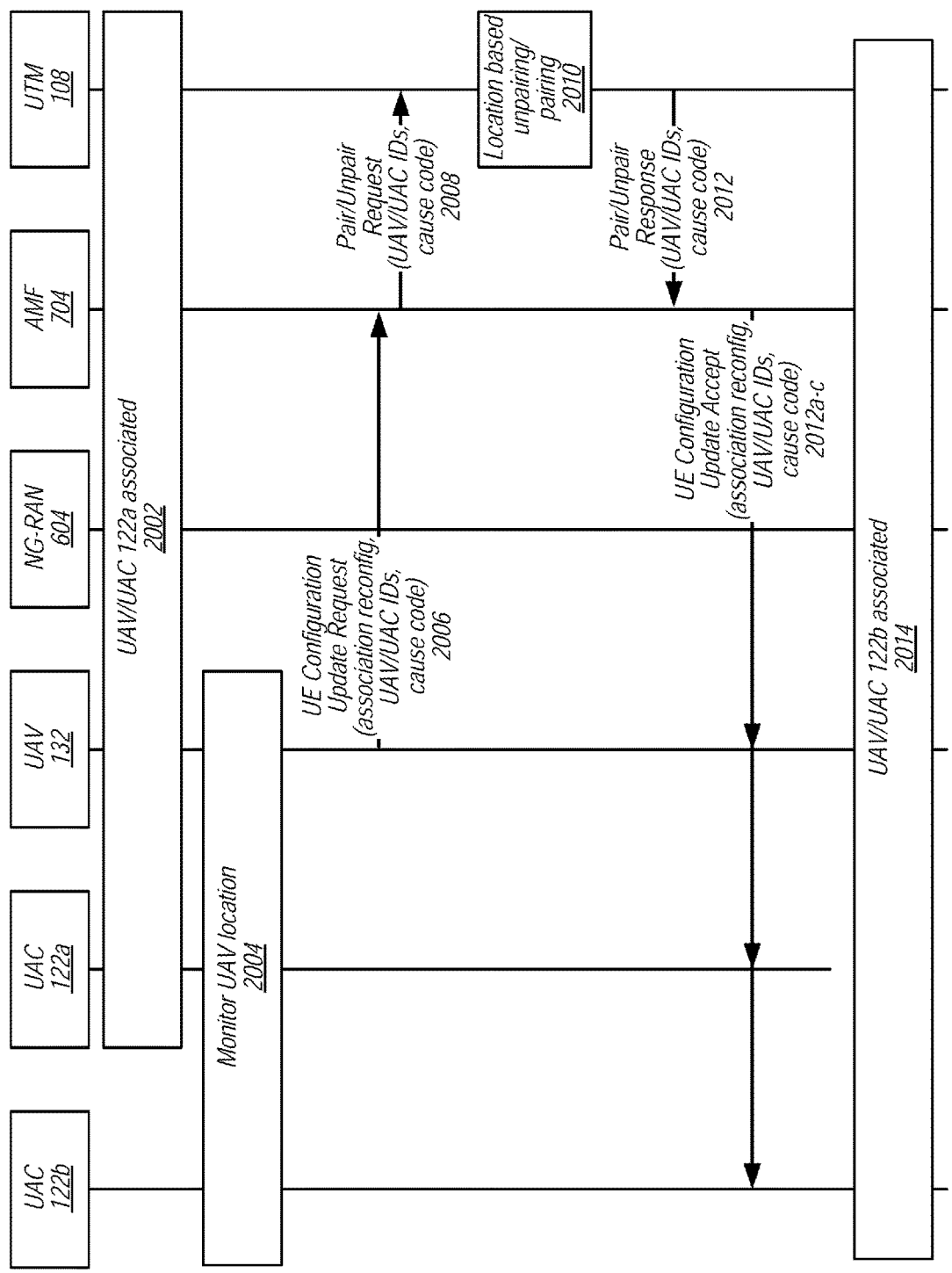
FIG. 20 illustrates an example of signaling for a UAV to request unpairing of the UAV from a host UAC and to request paring of the UAV to a target UAC, according to some embodiments.

For example, FIGS. 18 and 19 illustrate examples of signaling for a UAC to request an unpairing of a UAV and a host (or first) UAC and paring the UAV to a target (or second) UAC and FIG. 20 illustrates an example of signaling for a UAV to request an unpairing of the UAV and a host (or first) UAC and paring the UAV to a target (or second) UAC, according to some embodiments.

For example, FIG. 18 illustrates an example of signaling for a host UAC to request an unpairing of a UAV and the host UAC and paring the UAV to a target UAC, according to some embodiments. The signaling shown in FIG. 18 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 1802, UAV 132 and UAC 122a may be associated with one another and considered as a UAS by UTM 108. Thus, UAC 122a may be considered a host UAC of UAV 132. In other words, once UAC 122a is associated with UAV 132, UAC 122a may be considered as a host UAC of UAV 132. In some embodiments, UAC 122a may control UAV 132 via at least one C2 communication method, such as at least one of Direct C2 Communication, Network-Assisted C2 Communication, and/or UTM-Navigated C2 Communication.

At 1804, UAC 122a may monitor a location of UAV 132, e.g., with respect to mapped control regions. For example, UAC 122a may track location of UAV 132 with respect to one or more mapped control regions. In some embodiments, location tracking may include UAC 122a receiving location updates from UAV 132. In some embodiments, location tracking may include UAC 122a monitoring location of UAV 132 via one or more of cellular signals received from UAV 132, cellular signals received from UTM 108 (e.g., via AMF 704), global positioning signals received from UAV 132, global positioning signals associated with UAV 132 received from UTM 108, and/or other signals received from UAV 132. Note that in some embodiments, receiving information from UTM 108 and/or UAV 132 may include one or more intermediary nodes (e.g., such as NG RAN 604 (e.g., one or more base stations 102 of NG RAN 604 and/or AMF 704) receiving information from UAV 132 and/or UTM 108 and forwarding the information to UAC 122a, e.g., either directly and/or via one or more intermediary nodes.

In some embodiments, based on the location of UAV 132, UAC 122a may decide to initiate an unpairing procedure from UAV 132 and initiate a pairing procedure of UAV 132 to UAC 122b (e.g., a target UAC). In some embodiments, the decision to unpair may be based on determining that UAV 132 is leaving an area designated (e.g., by a mapping table accessible by UTM 108 and/or UAC 122a and/or UAC 122b) as being under control of UAC 122a and entering an area in which UAC 122a does not have control, such as a restricted area and/or an area designated (e.g., by a mapping table accessible by UTM 108 and/or UAC 122a and/or UAC 122b) as being under control of another UAC. In some embodiments, a restricted area may be defined as (and/or considered as) an area in which UAC 122a is not allowed (e.g., due to third party and/or governmental restrictions) to control UAV 132. Thus, UAC 122a may send a UE configuration request update message 1806 to AMF 704. The UE configuration request update message 1806 may include an indication of the paring/unpairing (e.g., an association reconfiguration), a cause code, and/or a UAV ID, a UAC ID, and/or a UAS ID. AMF 704 may then send a pair/unpair request message1808 to UTM 108. The pair/unpair request message1808 may include a UAC ID and/or UAS ID as well as a cause code.

At 1810, UTM 108 may confirm the unpairing/pairing of (e.g., based on the cause code) and/or decide (independently, e.g., based on receiving the pair/unpair request) to unpair UAV 132 from UAC 122a and pair UAV 132 to UAC 122b. In some embodiments, UTM 108 may track location of UAV 132 with respect to one or more mapped control regions. In some embodiments, location tracking may include UTM 108 receiving location updates from UAV 132 and/or UAC 122a and/or UAC 122b. In some embodiments, location tracking may include UTM 108 monitoring location of UAV 132 via one or more of cellular signals received from UAV 132, cellular signals received from UAC 122a and/or UAC 122b, global positioning signals received from UAV 132, global positioning signals associated with UAV 132 received from UAC 122a and/or UAC 122b, and/or other signals received from UAV 132 and/or UAC 122a and/or UAC 122b. Note that in some embodiments, UTM 108 receiving information from UAV 132 and/or UAC 122a may include one or more intermediary nodes (e.g., such as NG RAN 604 (e.g., one or more base stations 102 of NG RAN 604 and/or AMF 704) receiving information from UAV 132 and/or UAC 122a and/or UAC 122b and forwarding the information to UTM 108, e.g., either directly and/or via one or more intermediary nodes. UTM 108 may, based on receiving the pair/unpair request message 1808 from AMF 704, send a pair/unpair response message 1812 to AMF 704. The pair/unpair response message 1812 may include a UAV/UAC ID as well as a cause code. The AMF 704 may, based on receiving the pair/unpair response message 1812 from UTM 108, send a UE configuration update accept message 1814a to UAC 122a, a UE configuration update accept message 1814b to UAC 122b, and/or a UE configuration update accept message 1814c to UAV 132. The UE configuration update accept messages 1814a-c may each include confirmation of the paring/unpairing (e.g., an association reconfiguration complete), the cause code, and/or the UAV ID, the UAC IDs, and/or the UAS ID. At 1816, UAV 132 may be associated with UAC 122b, thereby completing the pair/unpair procedure. Thus, UAC 122b may now be considered a host UAC of UAV 132. In other words, once UAC 122b is associated with UAV 132, UAC 122b may be considered as a host UAC of UAV 132. In some embodiments, UAC 122b may control UAV 132 via at least one C2 communication method, such as at least one of Direct C2 Communication, Network-Assisted C2 Communication, and/or UTM-Navigated C2 Communication.

As another example, FIG. 19 illustrates an example of signaling for a target UAC to request an unpairing of a UAV and a host UAC and paring the UAV to the target UAC, according to some embodiments. The signaling shown in FIG. 19 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 1902, UAV 132 and UAC 122a may be associated with one another and considered as a UAS by UTM 108. Thus, UAC 122a may be considered a host UAC of UAV 132. In other words, once UAC 122a is associated with UAV 132, UAC 122a may be considered as a host UAC of UAV 132. In some embodiments, UAC 122a may control UAV 132 via at least one C2 communication method, such as at least one of Direct C2 Communication, Network-Assisted C2 Communication, and/or UTM-Navigated C2 Communication.

At 1904, UAC 122b may monitor a location of UAV 132, e.g., with respect to mapped control regions. For example, UAC 122b may track location of UAV 132 with respect to one or more mapped control regions. In some embodiments, location tracking may include UAC 122b receiving location updates from UAV 132. In some embodiments, location tracking may include UAC 122b monitoring location of UAV 132 via one or more of cellular signals received from UAV 132, cellular signals received from UTM 108 (e.g., via AMF 704), global positioning signals received from UAV 132, global positioning signals associated with UAV 132 received from UTM 108, and/or other signals received from UAV 132. Note that in some embodiments, receiving information from UTM 108 and/or UAV 132 may include one or more intermediary nodes (e.g., such as NG RAN 604 (e.g., one or more base stations 102 of NG RAN 604 and/or AMF 704) receiving information from UAV 132 and/or UTM 108 and forwarding the information to UAC 122*b*, e.g., either directly and/or via one or more intermediary nodes.

In some embodiments, based on the location of UAV 132, UAC 122*b* may decide to initiate an unpairing procedure of UAC 122*a* (e.g., the host UAC) from UAV 132 and initiate a pairing procedure of UAV 132 to UAC 122*b* (e.g., a target UAC). In some embodiments, the decision to unpair may be based on determining that UAV 132 is leaving an area designated (e.g., by a mapping table accessible by UTM 108 and/or UAC 122*a* and/or UAC 122*b*) as being under control of UAC 122*a* and entering an area in which UAC 122*a* does not have control, such as a restricted area and/or an area designated (e.g., by a mapping table accessible by UTM 108 and/or UAC 122*a* and/or UAC 122*b*) as being under control of another UAC, such as UAC 122*b*. In some embodiments, a restricted area may be defined as (and/or considered as) an area in which UAC 122*a* is not allowed (e.g., due to third party and/or governmental restrictions) to control UAV 132. Thus, UAC 122*b* may send a UE configuration request update message 1906 to AMF 704. The UE configuration request update message 1906 may include an indication of the paring/unpairing (e.g., an association reconfiguration), a cause code, and/or a UAV ID, a UAC ID, and/or a UAS ID. AMF 704 may then send a pair/unpair request message1908 to UTM 108. The pair/unpair request message1908 may include a UAC ID and/or UAS ID as well as a cause code.

At 1910, UTM 108 may confirm the unpairing/pairing of (e.g., based on the cause code) and/or decide (independently, e.g., based on receiving the pair/unpair request) to unpair UAV 132 from UAC 122*a* and pair UAV 132 to UAC 122*b*. In some embodiments, UTM 108 may track location of UAV 132 with respect to one or more mapped control regions. In some embodiments, location tracking may include UTM 108 receiving location updates from UAV 132 and/or UAC 122*a* and/or UAC 122*b*. In some embodiments, location tracking may include UTM 108 monitoring location of UAV 132 via one or more of cellular signals received from UAV 132, cellular signals received from UAC 122*a* and/or UAC 122*b*, global positioning signals received from UAV 132, global positioning signals associated with UAV 132 received from UAC 122*a* and/or UAC 122*b*, and/or other signals received from UAV 132 and/or UAC 122*a* and/or UAC 122*b*. Note that in some embodiments, UTM 108 receiving information from UAV 132 and/or UAC 122*a* and/or UAC 122*b* may include one or more intermediary nodes (e.g., such as NG RAN 604 (e.g., one or more base stations 102 of NG RAN 604 and/or AMF 704) receiving information from UAV 132 and/or UAC 122*a* and/or UAC 122*b* and forwarding the information to UTM 108, e.g., either directly and/or via one or more intermediary nodes. UTM 108 may, based on receiving the pair/unpair request message 1908 from AMF 704, send a pair/unpair response message 1912 to AMF 704. The pair/unpair response message 1912 may include a UAV/UAC ID as well as a cause code. The AMF 704 may, based on receiving the pair/unpair response message 1912 from UTM 108, send a UE configuration update accept message 1914*a* to UAC 122*a*, a UE configuration update accept message 1914*b* to UAC 122*b*, and/or a UE configuration update accept message 1914*c* to UAV 132. The UE configuration update accept messages 1914*a-c* may each include confirmation of the paring/unpairing (e.g., an association reconfiguration complete), the cause code, and/or the UAV ID, the UAC IDs, and/or the UAS ID. At 1916, UAV 132 may be associated with UAC 122*b*, thereby completing the pair/unpair procedure. Thus, UAC 122*b* may now be considered a host UAC of UAV 132. In other words, once UAC 122*b* is associated with UAV 132, UAC 122*b* may be considered as a host UAC of UAV 132. In some embodiments, UAC 122*b* may control UAV 132 via at least one C2 communication method, such as at least one of Direct C2 Communication, Network-Assisted C2 Communication, and/or UTM-Navigated C2 Communication.

As another example, FIG. 20 illustrates an example of signaling for a UAV to request an unpairing of the UAV from a host UAC and paring of the UAV to a target UAC, according to some embodiments. The signaling shown in FIG. 20 may be used in conjunction with any of the systems, methods, or devices shown in the Figures, among other devices. In various embodiments, some of the signaling shown may be performed concurrently, in a different order than shown, or may be omitted. Additional signaling may also be performed as desired. As shown, this signaling may flow as follows.

At 2002, UAV 132 and UAC 122*a* may be associated with one another and considered as a UAS by UTM 108. Thus, UAC 122*a* may be considered a host UAC of UAV 132. In other words, once UAC 122*a* is associated with UAV 132, UAC 122*a* may be considered as a host UAC of UAV 132. In some embodiments, UAC 122*a* may control UAV 132 via at least one C2 communication method, such as at least one of Direct C2 Communication, Network-Assisted C2 Communication, and/or UTM-Navigated C2 Communication.

At 2004, UAV 132 may monitor its location, e.g., with respect to mapped control regions. For example, UAV 132 may track its location with respect to one or more mapped control regions. In some embodiments, location tracking may include UAV 132 receiving location updates from UAC 122*a*, UAC 122*b*, and/or UTM 108. In some embodiments, location tracking may include UAV 132 monitoring its location via one or more of cellular signals received from UAV 132, cellular signals received from UTM 108 (e.g., via AMF 704), global positioning signals received from UAC 122*a*, global positioning signals associated with UAV 132 received from UTM 108, and/or other signals received from any of UAC 122*a*, UAC 122*b*, and/or UTM 108. Note that in some embodiments, receiving information from any of UAC 122*a*, UAC 122*b*, and/or UTM 108 may include one or more intermediary nodes (e.g., such as NG RAN 604 (e.g., one or more base stations 102 of NG RAN 604 and/or AMF 704) receiving information from any of UAC 122*a*, UAC 122*b*, and/or UTM 108 and forwarding the information to UAV 132, e.g., either directly and/or via one or more intermediary nodes.

In some embodiments, based on the location of UAV 132, UAV 132 may decide to initiate an unpairing procedure from UAC 122*a* and initiate a pairing procedure to UAC 122*b* (e.g., a target UAC). In some embodiments, the decision to unpair may be based on determining that UAV 132 is leaving an area designated (e.g., by a mapping table accessible by UAV 132 and/or UTM 108 and/or UAC 122*a* and/or UAC 122*b*) as being under control of UAC 122*a* and entering an area in which UAC 122*a* does not have control, such as a restricted area and/or an area designated (e.g., by a mapping table accessible by UAV 132 and/or UTM 108 and/or UAC 122*a* and/or UAC 122*b*) as being under control of another UAC. In some embodiments, a restricted area may be defined as (and/or considered as) an area in which UAC 122*a* is not allowed (e.g., due to third party and/or governmental restrictions) to control UAV 132. Thus, UAV 132 may send a UE configuration request update message 2006 to AMF 704. The UE configuration request update message 2006 may include an indication of the paring/unpairing (e.g., an association reconfiguration), a cause code, and/or a UAV ID, a UAC ID, and/or a UAS ID. AMF 704 may then send a pair/unpair request message 2008 to UTM 108. The pair/unpair request message 2008 may include a UAC ID and/or UAS ID as well as a cause code.

At 2010, UTM 108 may confirm the unpairing/pairing of (e.g., based on the cause code) and/or decide (independently, e.g., based on receiving the pair/unpair request) to unpair UAV 132 from UAC 122a and pair UAV 132 to UAC 122b. In some embodiments, UTM 108 may track location of UAV 132 with respect to one or more mapped control regions. In some embodiments, location tracking may include UTM 108 receiving location updates from UAV 132 and/or UAC 122a and/or UAC 122b. In some embodiments, location tracking may include UTM 108 monitoring location of UAV 132 via one or more of cellular signals received from UAV 132, cellular signals received from UAC 122a and/or UAC 122b, global positioning signals received from UAV 132, global positioning signals associated with UAV 132 received from UAC 122a and/or UAC 122b, and/or other signals received from UAV 132 and/or UAC 122a and/or UAC 122b. Note that in some embodiments, UTM 108 receiving information from UAV 132 and/or UAC 122a may include one or more intermediary nodes (e.g., such as NG RAN 604 (e.g., one or more base stations 102 of NG RAN 604 and/or AMF 704)) receiving information from UAV 132 and/or UAC 122a and/or UAC 122b and forwarding the information to UTM 108, e.g., either directly and/or via one or more intermediary nodes. UTM 108 may, based on receiving the pair/unpair request message 2008 from AMF 704, send a pair/unpair response message 2012 to AMF 704. The pair/unpair response message 2012 may include a UAV/UAC ID as well as a cause code. The AMF 704 may, based on receiving the pair/unpair response message 2012 from UTM 108, send a UE configuration update accept message 2014a to UAC 122a, a UE configuration update accept message 2014b to UAC 122b, and/or a UE configuration update accept message 2014c to UAV 132. The UE configuration update accept messages 2014a-c may each include confirmation of the paring/unpairing (e.g., an association reconfiguration complete), the cause code, and/or the UAV ID, the UAC IDs, and/or the UAS ID. At 2016, UAV 132 may be associated with UAC 122b, thereby completing the pair/unpair procedure. Thus, UAC 122b may now be considered a host UAC of UAV 132. In other words, once UAC 122b is associated with UAV 132, UAC 122b may be considered as a host UAC of UAV 132. In some embodiments, UAC 122b may control UAV 132 via at least one C2 communication method, such as at least one of Direct C2 Communication, Network-Assisted C2 Communication, and/or UTM-Navigated C2 Communication.

Figure 21:
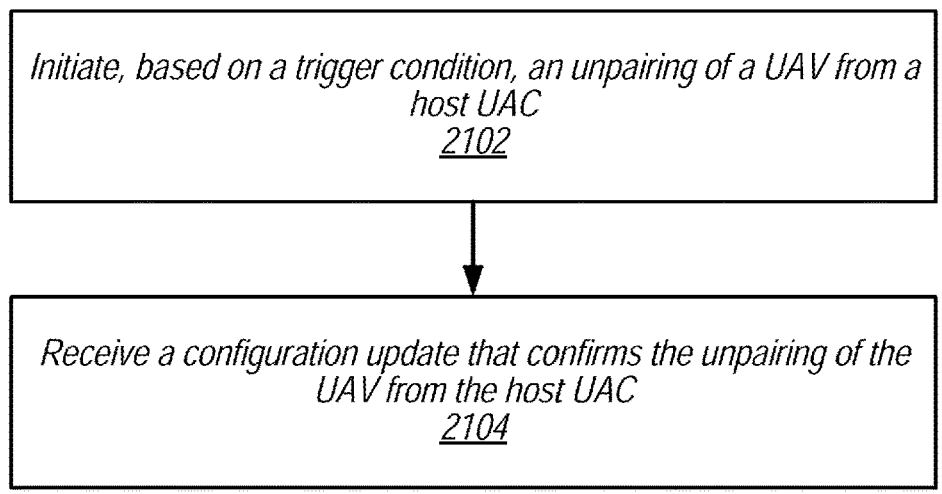
FIGS. 21-23 illustrate block diagrams of examples of methods for initiating a pairing and/or unpairing of an unmanned aerial vehicle (UAV) to/from a UAV controller (UAC), according to some embodiments.
Figure 22:
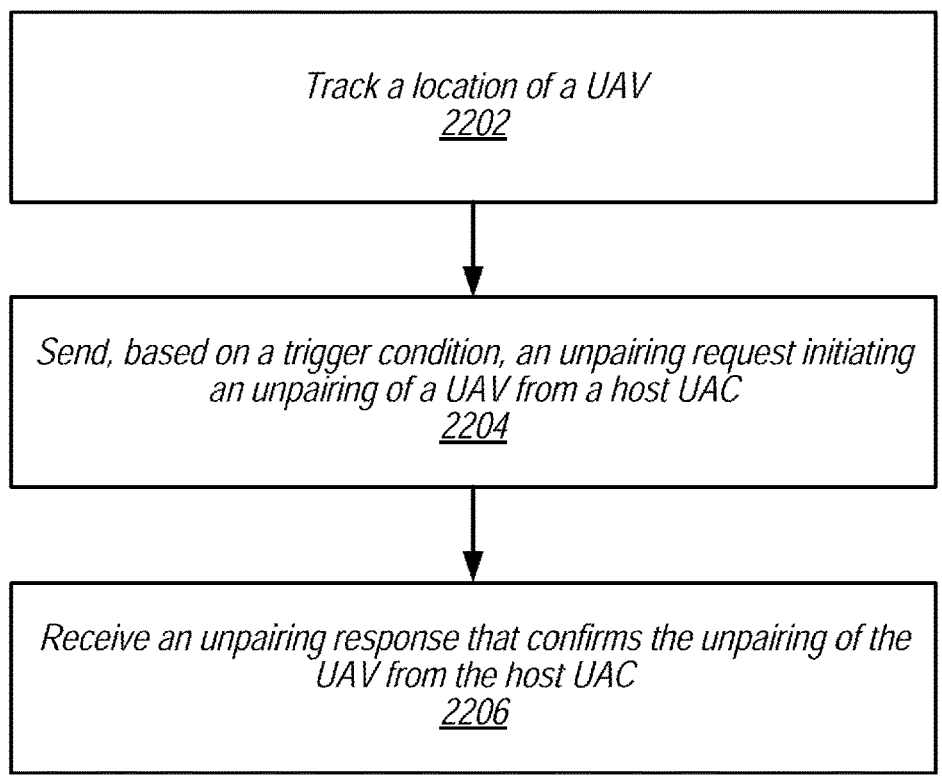
Figure 23:
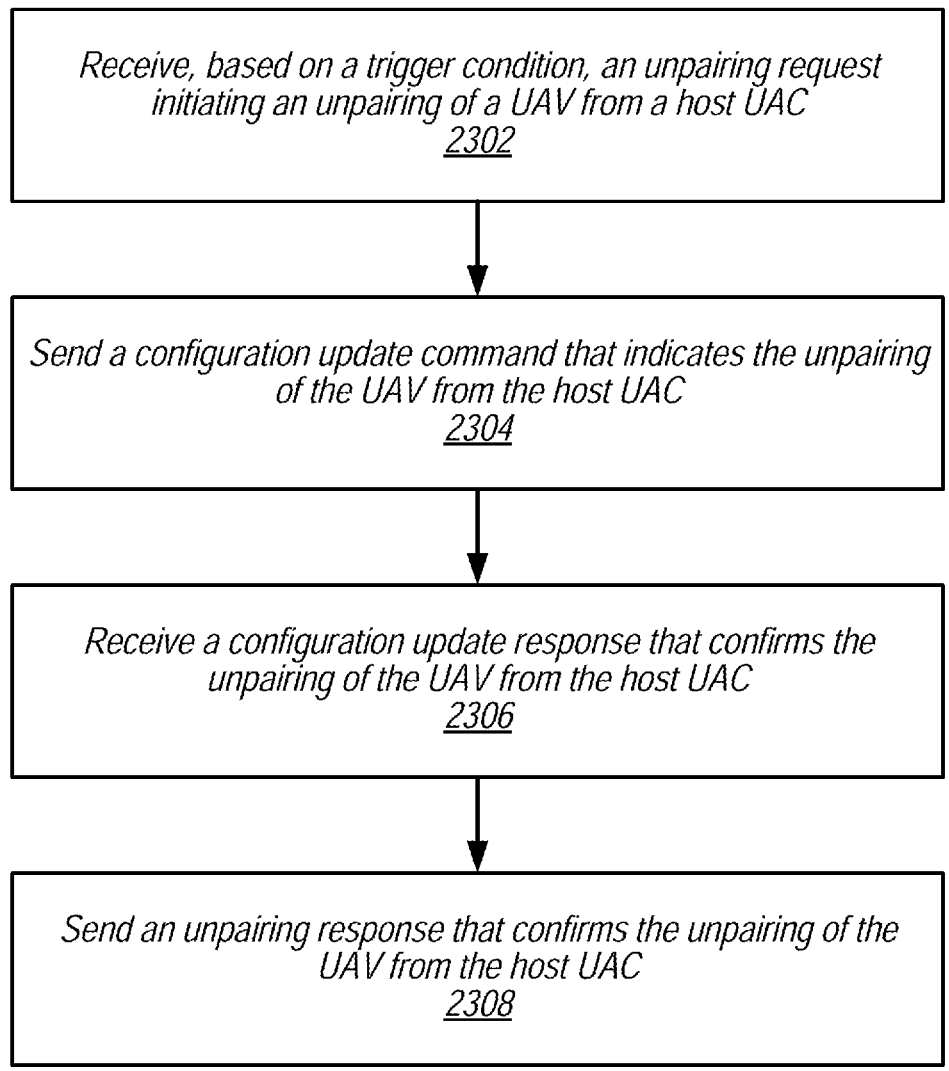

FIGS. 21-23 illustrate block diagrams of examples of methods for initiating a pairing and/or unpairing of an unmanned aerial vehicle (UAV) to/from a UAV controller (UAC), according to some embodiments. For example, FIG. 21 illustrates an example of a method for initiating a pairing and/or unpairing of an unmanned aerial vehicle (UAV) to/from a UAV controller (UAC) from the perspective of the UAV and/or UAC, according to some embodiments. As another example, FIG. 22 illustrates an example of a method for initiating a pairing and/or unpairing of an unmanned aerial vehicle (UAV) to/from a UAV controller (UAC) from the perspective of the UTM and/or TPAE, according to some embodiments. As a further example, FIG. 23 illustrates an example of a method for initiating a pairing and/or unpairing of an unmanned aerial vehicle (UAV) to/from a UAV controller (UAC) from the perspective of the AMF, according to some embodiments.

Turning to FIG. 21, the method shown in FIG. 21 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2102, a UE (e.g., such as UE 106) such as UAV 132 and/or UAC 122, may initiate, based on a trigger condition, an unpairing of a UAV from a host UAC. In some embodiments, the triggering condition may include any, any combination of, and/or all of (e.g., at least one of) the UAV moving from a location designated as controlled by the host UAC, the UAV moving into a location in which the host UAC is restricted from controlling the host UAV, and/or the host UAC losing signaling capabilities. In some embodiments, initiating the unpairing of the UAV from the host UAC may include the UE sending, to an AMF, such as AMF 704, a configuration request update message that may include an indication of the unpairing. In some embodiments, initiating the unpairing of the UAV from the host UAC may include initiating a pairing of the UAV to a target UAC. In some embodiments, the configuration request update message may include any, any combination of, and/or all of (e.g., at least one of) a cause code, an identifier associated with the UAV, an identifier associated with the host UAC, an identifier associated with an unmanned aerial system (UAS) (e.g., where the UAS includes the UAV and the host UAC), and/or an identifier associated with a target UAC.

At 2104, the UE may receive, e.g., from a network entity such as AMF 704, a configuration update message that may confirm the unpairing of the UAV from the host UAC. In some embodiments, the configuration update may include any, any combination of, and/or all of (e.g., at least one of) a cause code, an identifier associated with the UAV, an identifier associated with the host UAC, an identifier associated with an unmanned aerial system (UAS) (e.g., where the UAS includes the UAV and the host UAC), and/or an identifier associated with a target UAC. In embodiments in which the initiating the unpairing of the UAV from the host UAC includes initiating a pairing of the UAV to a target UAC, the configuration update may confirm the pairing of the UAV to the target UAC.

In some embodiments, the UE may track a location of the UAV with respect to one or more control areas. In such embodiments, the one or more control areas may be mapped to one or more UACs, where a respective UAC of the one or more UACs is designated as controller of the UAV for a respective control area of the one or more control areas.

Turning to FIG. 22, the method shown in FIG. 22 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2202, a computer system (e.g., a server such as server 104) such as UTM 108, may track location of a UAV, such as UAV 132. In some embodiments, tracking the location of the UAV may include tracking a location of the UAV with respect to one or more control areas. In such embodiments, the one or more control areas may be mapped to one or more UACs, where a respective UAC of the one or more UACs is designated as controller of the UAV for a respective control area of the one or more control areas. In some embodiments, tracking the location of the UAV may include tracking a location of the UAV based on one or more of cellular signals received from the UAV via the network node, cellular signals received from the host UAC via the network node, cellular signals received from a target UAC via the network node, global positioning signals received from the UAV via the network node, global positioning signals associated with the UAV received from the host UAC, and/or global positioning signals associated with the UAV received from the target UAC.

At 2204, the computer system may send (e.g., to a network entity such as AMF 704), based on a trigger condition, an unpairing request indicating an unpairing of the UAV from a host UAC. In some embodiments, the triggering condition may include any, any combination of, and/or all of (e.g., at least one of) the UAV moving from a location designated as controlled by the host UAC, the UAV moving into a location in which the host UAC is restricted from controlling the host UAV, and/or the host UAC losing signaling capabilities. In some embodiments, the unpairing request may include any, any combination of, and/or all of (e.g., at least one of) a cause code, an identifier associated with the UAV, an identifier associated with the host UAC, an identifier associated with an unmanned aerial system (UAS) (e.g., where the UAS includes the UAV and the host UAC), and/or an identifier associated with a target UAC. In some embodiments, sending the unpairing request may include sending a pairing request to paring of the UAV to a target UAC, where the unpairing request further includes an identifier associated with the target UAC. In some embodiments, the unpairing request may be sent via a network access stratum (NAS) layer message.

At 2206, the computer system may receive, e.g., from a network entity such as AMF 704, an unpairing response message that may confirm the unpairing of the UAV from the host UAC. In some embodiments, the unpairing response message may include any, any combination of, and/or all of (e.g., at least one of) a cause code, an identifier associated with the UAV, an identifier associated with the host UAC, an identifier associated with an unmanned aerial system (UAS) (e.g., where the UAS includes the UAV and the host UAC), and/or an identifier associated with a target UAC. In some embodiments, the unpairing response may be received via a network access stratum (NAS) layer message.

Turning to FIG. 23, the method shown in FIG. 23 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 2302, a network entity such as AMF 704, may receive, based on a trigger condition, an unpairing request from a UTM, such as UTM 108. The unpairing request may initiate an unpairing of a UAV from a host UAC. In some embodiments, the triggering condition may include any, any combination of, and/or all of (e.g., at least one of) the UAV moving from a location designated as controlled by the host UAC, the UAV moving into a location in which the host UAC is restricted from controlling the host UAV, and/or the host UAC losing signaling capabilities. In some embodiments, the unpairing request may include any, any combination of, and/or all of (e.g., at least one of) a cause code, an identifier associated with the UAV, an identifier associated with the host UAC, an identifier associated with an unmanned aerial system (UAS) (e.g., where the UAS includes the UAV and the host UAC), and/or an identifier associated with a target UAC. In some embodiments, the unpairing request of the UAV from the host UAC may further include a pairing request to pair the UAV to a target UAC and the unpairing request may further include an identifier associated with the target UAC. In some embodiments, the unpairing request may be received via a network access stratum (NAS) layer message.

At 2304, the network entity may send, e.g., to a UE such as UAV 132 and/or UAC 122, a configuration update command that may indicate the unpairing of the UAV from the host UAC. In some embodiments, the configuration update command may include any, any combination of, and/or all of (e.g., at least one of) a cause code, an identifier associated with the UAV, an identifier associated with the host UAC, an identifier associated with an unmanned aerial system (UAS) (e.g., where the UAS includes the UAV and the host UAC), and/or an identifier associated with a target UAC.

At 2306, the network entity may receive, from the UE, a configuration update response that may confirm the unpairing of the UAV from the host UAC. In some embodiments, the configuration update response may include any, any combination of, and/or all of (e.g., at least one of) a cause code, an identifier associated with the UAV, an identifier associated with the host UAC, an identifier associated with an unmanned aerial system (UAS) (e.g., where the UAS includes the UAV and the host UAC), and/or an identifier associated with a target UAC.

At 2308, the network entity may send, to the UTM, an unpairing response message that may confirm the unpairing of the UAV from the host UAC. In some embodiments, the configuration update response, and/or the unpairing response message may include any, any combination of, and/or all of (e.g., at least one of) a cause code, an identifier associated with the UAV, an identifier associated with the host UAC, an identifier associated with an unmanned aerial system (UAS) (e.g., where the UAS includes the UAV and the host UAC), and/or an identifier associated with a target UAC. In embodiments in which the unpairing request further includes a pairing request, the unpairing response may confirm the pairing of the UAV to a target UAC. In some embodiments, the unpairing response may be sent via a network access stratum (NAS) layer message.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
   at least one antenna;
   at least one radio, wherein the at least one radio is configured to perform cellular communication using at least one radio access technology (RAT); and
   one or more processors coupled to the at least one radio, wherein the one or more processors and the at least one radio are configured to perform voice and/or data communications;
   wherein the one or more processors are configured to cause the wireless device to:
   initiate, based on a triggering condition, an unpairing of an unmanned aerial vehicle (UAV) from a host UAV controller (UAC), wherein the UAV is currently paired to the host UAC; and
   receive, from a network, a configuration update, wherein the configuration update confirms the unpairing of the UAV from the host UAC.

2. The wireless device of claim 1,
   wherein the triggering condition includes at least one of:
   the UAV moving from a location designated as controlled by the host UAC;
   the UAV moving into a location in which the host UAC is restricted from controlling the host UAV; or
   the host UAC losing signaling capabilities.

3. The wireless device of claim 1,
   wherein the configuration update includes one or more of:
   a cause code;
   an identifier associated with the UAV;
   an identifier associated with the host UAC;
   an identifier associated with an unmanned aerial system (UAS), wherein the UAS includes the UAV and the host UAC; or
   an identifier associated with a target UAC.

4. The wireless device of claim 1,
   wherein, to initiate the unpairing of the UAV from the host UAC, the one or more processors are further configured to cause the wireless device to send, to a core access and mobility management function (AMF) of a network hosting the UAV, a configuration request update message, wherein the configuration request update message includes an indication of the unpairing.

5. The wireless device of claim 1,
   wherein, to initiate the unpairing of the UAV from the host UAC, the one or more processors are further configured to cause the wireless device to initiate a pairing of the UAV to a target UAC.

6. The wireless device of claim 5,
   wherein the configuration update confirms the pairing of the UAV to the target UAC.

7. The wireless device of claim 1,
   wherein the one or more processors are further configured to cause the wireless device to:
   track a location of the UAV with respect to one or more control areas, wherein the one or more control areas are mapped to one or more UACs, wherein a respective UAC of the one or more UACs is designated as controller of the UAV for a respective control area of the one or more control areas.

8. The wireless device of claim 1,
   wherein the configuration update is received via a network access stratum (NAS) layer message.

9. The wireless device of claim 1,
   wherein the wireless device is one of the UAV, the host UAC, or a target UAC.

10. An apparatus, comprising:
    a memory; and
    a processing element in communication with the memory, wherein the processing element is configured to:
    initiate, based on a triggering condition, an unpairing of an unmanned aerial vehicle (UAV) from a host UAV controller (UAC), wherein the UAV is currently paired to the host UAC; and
    receive, from a network, a configuration update message, wherein the configuration update message confirms the unpairing of the UAV from the host UAC, and wherein the configuration update includes one or more of:
    a cause code;
    an identifier associated with the UAV;
    an identifier associated with the host UAC;
    an identifier associated with an unmanned aerial system (UAS), wherein the UAS includes the UAV and the host UAC; or
    an identifier associated with a target UAC.

11. The apparatus of claim 10,
    wherein the triggering condition includes at least one of:
    the UAV moving from a location designated as controlled by the host UAC;
    the UAV moving into a location in which the host UAC is restricted from controlling the host UAV; or
    the host UAC losing signaling capabilities.

12. The apparatus of claim 10,
    wherein, to initiate the unpairing of the UAV from the host UAC, the processing element is further configured to generate instructions to send, to a core access and mobility management function (AMF) of a network hosting the UAV, a configuration request update message, wherein the configuration request update message includes an indication of the unpairing, and wherein the configuration request update message includes one or more of:
- the cause code;
- the identifier associated with the UAV;
- the identifier associated with the host UAC;
- the identifier associated with the UAS; or
- the identifier associated with the target UAC.

13. The apparatus of claim 10,
wherein, to initiate the unpairing of the UAV from the host UAC, the processing element is further configured to initiate a pairing of the UAV to the target UAC; and
wherein the configuration update confirms the pairing of the UAV to the target UAC.

14. The apparatus of claim 10,
wherein the processing element is further configured to:
track a location of the UAV with respect to one or more control areas, wherein the one or more control areas are mapped to one or more UACs, wherein a respective UAC of the one or more UACs is designated as controller of the UAV for a respective control area of the one or more control areas.

15. The apparatus of claim 10,
wherein one of the UAV, the host UAC, or the target UAC includes the apparatus.

16. A non-transitory computer readable memory medium storing program instructions executable by processing circuitry to cause a computer system to:
track a location of an unmanned aerial vehicle (UAV), wherein the UAV is paired to a host UAV controller (UAC);
send, based on a triggering condition, an unpairing request to a network entity, wherein the unpairing request initiates an unpairing of the UAV from the host UAC; and
receive, from the network entity, an unpairing response, wherein the unpairing response confirms the unpairing of the UAV from the host UAC.

17. The non-transitory computer readable memory medium of claim 16,
wherein tracking the location of the UAV includes tracking a location of the UAV based on one or more of:
- cellular signals received from the UAV via the network entity;
- cellular signals received from the host UAC via the network entity;
- cellular signals received from a target UAC via the network entity;
- global positioning signals received from the UAV via the network entity;
- global positioning signals associated with the UAV received from the host UAC; or
- global positioning signals associated with the UAV received from the target UAC.

18. The non-transitory computer readable memory medium of claim 16,
wherein the unpairing request is sent via a network access stratum (NAS) layer message, and wherein the unpairing response is received via a NAS layer message.

19. The non-transitory computer readable memory medium of claim 16,
wherein the network entity includes a core access and mobility management function (AMF) of a network hosting the UAV; and
wherein the computer system includes an unmanned aerial system (UAS) traffic management (UTM) system or a third party authorized entity (TPAE) system.

20. The non-transitory computer readable memory medium of claim 16,
wherein, to send the unpairing request, the program instructions are further executable to cause the computer system to send a pairing request that initiates a pairing of the UAV to a target UAC, wherein the unpairing request further includes an identifier associated with the target UAC; and
wherein the unpairing response confirms the pairing of the UAV to the target UAC.

* * * * *